United States Patent
Rivkin

(10) Patent No.: US 10,986,470 B2
(45) Date of Patent: *Apr. 20, 2021

(54) BI-DIRECTIONAL INTEGRATION AND CONTROL OF MANAGED AND UNMANAGED DEVICES

(71) Applicant: ZODIAC SYSTEMS, LLC, Hicksville, NY (US)

(72) Inventor: Michael Rivkin, Woodbury, NY (US)

(73) Assignee: ZODIAC SYSTEMS, LLC, Hicksville, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/444,969

(22) Filed: Jun. 18, 2019

(65) Prior Publication Data

US 2019/0306671 A1   Oct. 3, 2019

Related U.S. Application Data

(62) Division of application No. 15/583,330, filed on May 1, 2017, now Pat. No. 10,349,234.

(Continued)

(51) Int. Cl.

| | |
|---|---|
| H04N 21/436 | (2011.01) |
| H04W 4/12 | (2009.01) |
| H04W 68/02 | (2009.01) |
| H04M 3/42 | (2006.01) |
| H04L 29/08 | (2006.01) |
| H04N 21/437 | (2011.01) |
| H04M 15/00 | (2006.01) |

(Continued)

(52) U.S. Cl.
CPC ........... *H04W 4/12* (2013.01); *H04L 61/1594* (2013.01); *H04L 67/306* (2013.01); *H04M 3/42059* (2013.01); *H04M 15/64* (2013.01); *H04M 15/68* (2013.01); *H04N 21/41265* (2020.08); *H04N 21/437* (2013.01); *H04N 21/43615* (2013.01); *H04N 21/4882* (2013.01); *H04N 21/6402* (2013.01); *H04W 4/24* (2013.01); *H04W 4/80* (2018.02); *H04W 68/02* (2013.01); *H04L 12/1809* (2013.01); *H04L 45/745* (2013.01); *H04L 61/2007* (2013.01); *H04L 61/2076* (2013.01); *H04M 7/0075* (2013.01); *H04N 21/4753* (2013.01); *H04N 21/812* (2013.01); *H04W 4/60* (2018.02)

(58) Field of Classification Search
CPC ........... H04N 21/437; H04N 21/41265; H04N 21/43615; H04W 4/12
See application file for complete search history.

(56) References Cited

PUBLICATIONS

Information Disclosure Statements filed in parent U.S. Appl. No. 15/583,330, on Jun. 28, 2017 and May 22, 2018.

(Continued)

*Primary Examiner* — Joshua D Taylor
(74) *Attorney, Agent, or Firm* — Lawrence G. Fridman, Esq.; Feigin & Fridman, LLC

(57) ABSTRACT

A communications system is provided employing two-way integration approach providing access to notifications and actions occurring on unmanaged communication devices through the use of TV. The system includes installation of an application on unmanaged devices providing the ability to access all notifications and actions occurring on the unmanaged devices using TV. The unmanaged device obtains an input directly from TV from an application server which in turn obtains its input primarily from a TV. The input is not limited to the TV only, and can come from other sources.

13 Claims, 20 Drawing Sheets

Related U.S. Application Data

(60) Provisional application No. 62/329,903, filed on Apr. 29, 2016.

(51) Int. Cl.
| | | |
|---|---|---|
| *H04W 4/80* | (2018.01) | |
| *H04L 29/12* | (2006.01) | |
| *H04N 21/488* | (2011.01) | |
| *H04W 4/24* | (2018.01) | |
| *H04N 21/6402* | (2011.01) | |
| *H04N 21/41* | (2011.01) | |
| *H04N 21/475* | (2011.01) | |
| *H04M 7/00* | (2006.01) | |
| *H04L 12/18* | (2006.01) | |
| *H04N 21/81* | (2011.01) | |
| *H04W 4/60* | (2018.01) | |
| *H04L 12/741* | (2013.01) | |

(56) References Cited

PUBLICATIONS

Office Action dated Oct. 5, 2018 for parent U.S. Appl. No. 15/583,330, filed May 1, 2017.

BI-DIRECTIONAL INTEGRATION AND CONTROL OF MANAGED AND UNMANAGED DEVICES

CROSS-REFERENCE TO RELATED APPLICATION

The present application is a Divisional Application of currently pending patent application Ser. No. 15/583,330, filed May 1, 2017, which claims priority of Provisional. Patent Application Ser. No. 62/329,903 filed by the Applicant on Apr. 29, 2016 the entire disclosure of those Applications is hereby incorporated by reference in their entirety.

FIELD OF THE INVENTION

This invention relates to communications systems, and more particularly to communications systems that employ two-way integration approach providing access to notifications and actions occurring on unmanaged communication devices through the use of TV.

BACKGROUND OF THE INVENTION

Cable television service has become a dominant vehicle for the delivery of electronic entertainment content throughout the United States, and in many parts of the world. Modern cable systems, which were originally designed to deliver analog RF television signals now largely deliver encoded digital data at very high speeds over a conventional, low-loss coaxial cable or a combination of fiber-optic and coaxial cables with appropriate interfaces therebetween. These signals are employed in two-way communication between a cable subscriber and the operator.

A common application involving both two-way communications is the delivery of so-called digital cable service. In a digital cable implementation, the subscriber receives broadcast television signals in digital form via MPEG, TCP/IP or another type of communication. The digital signal is typically received at the subscriber's location by a digital set top box. The set top box is, in essence, a small computer that converts received digital signals into NTSC (or another format) signal capable of being displayed on a conventional television. Most set top boxes, in fact, provide a variety of output connectors that deliver the video signal to a television or display monitor in a variety of formats including S-video, composite and component.

A set top box is a networked computing device. Taking advantage of the availability of two-way digital communication over the line, the set to box can act as a portal through which the subscriber can interact with the head-end server and remote network beyond. Practically all set top boxes accommodate a remote control, that transmits IR (infrared) and/or RF (radio frequency) signals to the box to operate its various functions. Typically set top box functions are displayed via menu screens that often emulate the look and feel of a personal computer's graphical user interface (GUI) display. The remote allows the user to scroll through menu items and highlight the item of interest. Remotes often include a conventional cursor that can be moved about the screen via a four-way toggle to more closely match the point-and-click experience of a personal computer.

Many set top boxes and cable providers now provide functioning web browsers that are accessed by the appropriate remote control buttons and/or menu screens that are displayed on the television. These browsers support certain interactive functions allow entered subscriber requests to be delivered from the server's storage or from the Internet.

Furthermore, the use of mobile or cellular telephones is now extremely common and most available telephones support Short Message Service (SMS) or "text" messaging applications and include small graphical user interface (GUI) display screens for creating and reading such messages (as well as other activities, such as picture/video viewing, games and the like). An SMS message (or simply, "SMS") is convenient way to communicate without need of a voice exchange. Moreover, SMS messages can include embedded hyperlinks (also simply termed, "link(s)") that are transmitted back to a service provider and allow responses from an Internet based content provider via the cellular network. These responses can include downloads to the cellular telephone of requested content from the provider. A technique that further facilitates downloads of such content is also desirable.

On the other hand, the prior art communication systems do not have ability to access all notifications and actions occurring on unmanaged communication devices or mobile devices or phones using TV, and to manage such device activities from TV screen.

SUMMARY OF THE INVENTION

One of the main objects of the invention is to provide a system which includes installation of an application on unmanaged devices such as iPhone or Android phones, also commonly referenced to as a mobile device, providing the ability to access all notifications and actions occurring on such mobile devices using TV. The mobile device obtains an input directly from TV from an application server which in turn obtains its input primarily from a TV. It should be noted however that the input is not limited to the TV only, and can come from other sources. For example, an input can come from another unmanaged device, PC, or another TV.

In the case of TV application, the system enables a user having operational TV to access and display anything that comes from an unmanaged device or mobile device or phone on the TV screen. As an example, if a phone receives a call, a large TV screen will be able to display information which is available on the phone. Thus, a user through the use of a TV screen, has an option on how to manage this call, i.e., hang up, send to voice mail, reply with a short pre-programmed message or to create a custom reply message. A user can respond by instructing a phone how to manage the call from the TV screen. If a person using the phone sends SMS or another message, the message will be also displayed on a TV screen, so that a viewer can ignore the message or reply to such message from the TV screen. According to the invention, a user can provide any notification and control any applications that are available on a phone by using a TV screen. This is inclusive of SMS messages, alarms, emails and other applications. As an example, these applications can include eBay, Amazon or other applications controllable by the user from the telephone. If an alarm ringing on the phone, such alarm will be also displayed on the TV providing a viewer with an alarm reminder of a meeting. In case of a calendar alert or meeting alert, the alert which pops up on the phone can be propagated to the TV screen notifying a viewer about forthcoming event. A viewer can reply by using a TV to instruct the phone either to cancel the alert, reply to it, notify or use that application in any shape or form to send out instructions to the phone on how to handle the notification.

The Bi-directional uniqueness of the invention also consists of adding other applications, so TV can control a phone of the user. For example, in case of a commercial appearing on TV for a local dentist, with a phone number being displayed, the viewer can opt up by pressing remote control buttons to save this number to the phone memory. In this application, TV provides the phone with the name of the dentist, so that the dentist information is placed in the phone book through a command generated by the viewer from a TV screen. In case of an advertisement for an event or a movie on TV, a user can opt to create an event entry in a calendar of a phone based on the TV information.

In a similar fashion, any application available on a phone, such as a weather application, a viewer can obtain related information such as weather conditions as a source feed from an unmanaged device or mobile device or phone to TV screen instead of going elsewhere. According to the invention, a phone is a gateway of a TV viewer to the outside world. This is because practically any information available on the phone will become accessible and can be displayed on and be operated from a large screen TV. In case of e-commerce applications, such as eBay or Amazon, upon receiving a notification on the phone, a viewer can also observe the notification on the respective TV screen and is able to respond to such notification, for example to increase a bid or cancel the bid, etc. all through use of the TV screen. The above demonstrates a bi-directional control provided by a system of the invention, wherein TV is completely in control of the telephone activities of a user, so that the phone can deliver substantial amount of new data and information on a TV display. This represents the ability of the system to convey the data from the mobile device and display it on TV screen.

In the system and method of the invention as a first step, the user generates a command/instruction by pressing a button on a remote control unit (RCU). This command is received by the agent on the set top box, wherein the set top box then communicates the command to the agent on the mobile device and asks for example to retrieve the information of interest such as weather conditions, etc.

As to the next step, the agent on the mobile device communicates to the application on the mobile device or retrieves respective data from an external source, such as web services for example. The obtained data is sent back to the set top box agent. The set top box agent presents the data on a TV screen, so the user can observe his or her request. Along with the actual information being retrieved, the agent on the mobile device also sends to the agent on the set top box the instructions on how this data needs to be represented such as colors, fonts, sizes, position on screen, relative of the elements and so on. The instructions also include indication as to what visual elements are interactive and which commands for the applications on the mobile device are linked to each such interactive visual element. The agent on the set top box does not need to figure out the specific way the data needs to be presented. Instead, it uses the received instructions and generates a typical rectangular window on TV screen to display the retrieved information.

For the above purposes, a user needs to download a proprietary enabled application forming a part of the invention on any ubiquitous computing device or smart device such as cell phone, tablet, etc. This application also provides additional functionalities navigation, voice control, etc. to such devices. After downloading this application, the user performs installation of the application at which point also agrees for the application to have access to notifications and other items on the ubiquitous computing devices. Upon completion of the download and installation, the agent of the invention system will be running and monitoring all events on the unmanaged device. The application on the unmanaged device relays all relevant information to set-top box directly or through intermediary messaging server such as AMS, whereas the intermediary messaging server directs the necessary information to the set top box, wherein the agent is enabled and can be instructed on the set top box what needs to be done. The bi-directional communication occurs the same way when the agent on the set top box collects any information it needs from the TV and sends it back to the intermediary messaging server and the server sends a command with specific instructions to an agent on the unmanaged device to proceed with a specific task, such as to create a contact, send an SMS, make a phone call, reject a phone call, etc. This is a bi-directional control.

Software Agent on TV Controller is a software application that listens to a command from the TV whereas said command can be optionally communicated through an intermediary messaging server and generates instructions for the device what to do. So, if the agent can create a contact on the device, it will do so. If the agent has a permission to make a call from the phone, it will provide instruction to the phone to call a specific number (since VoIP network protocol support is not normally existent on TV Controllers, Message Transformation Module as inventive part of the described functionality will perform message translation from TV controller native protocol to VoIP protocol e.g. SIP). In addition, Software Agent hosts Transport Manager, performs registration on Address Mapper and Device Pairing Function.

The Software Agent on Unmanaged Device is a software application associated with the unmanaged device performs the following main functions:

Listens and accepts calls incoming from TV Controller, arriving on different transports and routes them to the underlying unmanaged software through Circuit Breaker adapters.

Hosts Mobile Services Registry

Performs pairing function.

Perform device registration against Address Mapper

Subscribes to events (subject to applicable granted permission) happening in unmanaged applications.

Inventive nature of the Software Agent running on Unmanaged Device is the way it is integrated with unmanaged applications acting as promiscuous event listener. Such listener can run in pro-active mode (i.e. perform certain business logic actions based in inflow of events and signals from unmanaged applications), or be in reactive mode (where all events are collected unmodified and passed to intermediary Application Server or TV Controller for processing). Reverse mode of operation is also possible. Using colloquial language terms, the Software Agent is informed on everything occurring on the unmanaged device and at the same time can modify or act on the unmanaged on behalf of any software component or as substitute of the customer activities on Unmanaged Device.

The unmanaged Device's Software Agent needs to have a permission to modify the unmanaged device operation to get the notifications. Then it communicates the notifications to the paired device and will listen to the respective reactive signaling to perform actions on the unmanaged device (e.g. place a phone call, send a short message, create a contact list or calendar invitation).

BRIEF DESCRIPTION OF THE DRAWINGS

Referring now to the drawings which are provided to illustrate and not to limit the invention, wherein.

TERMINOLOGY

Figure 1:
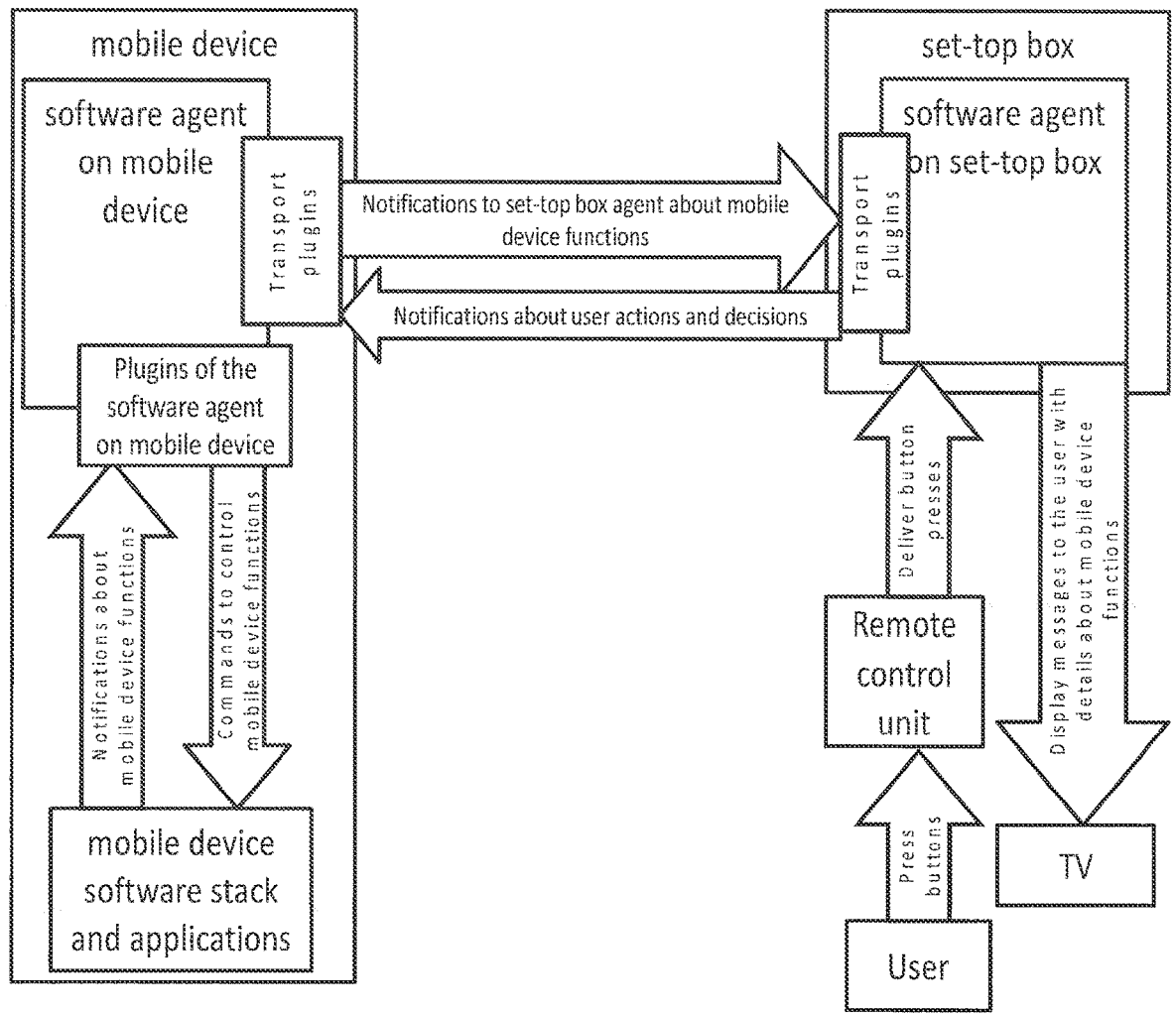
FIG. 1 is a diagram illustrating system architecture without use of intermediary server middleware of one embodiment of the system and method of the invention.

For the purpose of the present invention, the term "TV Controller" is used to reference to any device capable of (a) communicating with unmanaged devices as set forth below directly or indirectly via intermediary messaging server, (b) delivering video streams and graphical user interface (GUI) to a TV screen and, (c) receiving user input via connected human interface devices (HID) such as remote control unit (RCU), keyboard, mouse, etc. One example of such TV Controller can be a set-top box (STB) which is used as an example TV Controller throughout of this document.

The following devices, but not limited to, comprise the TV Controller:
    Set-top box (STB):
        Set-top boxes with two-way connectivity
        Note: set-top boxes with one way connectivity such as Digital Television Adapter (DTA) do not constitute TV Controller in terms of the present invention due to lack of ability to send messages to unmanaged devices
    Game console such as:
        SONY PlayStation series
        Nintendo game consoles
        Microsoft XBOX series
        Other game consoles
    Media players such as:
        Apple TV
        Google Chromecast
        Amazon Fire TV
        Android TV based media players from various vendors
        Televisions built with Samsung SmartTV technology
        Televisions built with other smart TV technologies
        Other media players
    TV-capable and video-capable devices built with technologies such as:
        Android TV
        Apple tvOS
        Gear VR
        Linux
        Microsoft HoloLens Microsoft Windows
Oculus Rift
Steam OS
Stream VR
Tizen
WebGL
WebGL ES
Other platforms
Personal computer (PC) with graphical user interface (GUI) and operating system (OS) such as
Microsoft Windows
Apple OSX
Linux
UNIX
Other operating systems
Smartphone such as
Apple iPhone
Android phone
Windows phone
Other smartphones
Tablets such as
Android tablets
Apple iPad
Other tablets The term "STB", or "set-top box", serves the purpose of the example embodiment of the TV Controller; other TV Controllers as set forth above can be used for such embodiments.

For the purpose of the present invention, the term "unmanaged device" is used to reference a user's device paired with and being accessed and controlled from said TV Controller.

The following devices, but not limited to, comprise the unmanaged device:
Smartphone such as
Apple iPhone
Android phone
Windows phone
Other smartphones
Tablets such as
Android tablets
Apple iPad
Other tablets
Personal computer (PC) with graphical user interface (GUI) and operation system (OS) such as
Microsoft Windows
Apple OSX
Linux
UNIX
Other operating systems The term "mobile device" is used interchangeably with the term "unmanaged device" as set forth above.

The term "smartphone", serves the purpose of the example embodiment of the unmanaged device; other unmanaged devices as set forth above can be used for such embodiments.

The terms "TV Controller" and "unmanaged device" as set forth in definitions above, can reference to the physically similar or identical devices such as a personal computer, a smartphone, or a tablet.

The present invention specifically differentiates TV Controller as a device primarily utilized by the user to consume video content such as TV channels, Video On Demand (VOD) movies, Per-Pay-View (PPV) content, subscription services such as Netflix, Amazon Prime, Hulu, etc., and other video content. TV Controller typically, but not necessarily, connects to a large screen television (TV) for the comfortable consumption of the video content. Some embodiments of the TV Controller such as personal computers and tablets typically have a screen of the size sufficient for personal video consumption in which case connection to a physical television device is optional or not needed.

The present invention further specifically differentiates unmanaged devices as a device primarily used by the user to consumer other non-video related content and perform other activities such as, but not limited to, telephone calls, video calls, text messaging, activity organizers such as to-do lists, calendars, notes, etc., web surfing, GPS-based navigation (General Positioning System), and other activities.

The terms "Service Operator", "Service Provider", "Cable Operator", "Cable Service Provider", "Multi Service Operator", and "Multi Service Provider" are used interchangeably and refer to the entity such as a commercial company that delivers television services to the one or many geographical areas and may also deliver other services such as Internet access, landline telephony, cellular telephony, web hosting, and other services.

The term "ACable" refers to a fictional Cable Service Provider and used as an example of such company.

The term "Unmanaged Application" refers to a software application on the unmanaged device.

DETAILED DESCRIPTION OF THE INVENTION

Diagram of FIG. 1 refers to the deployment architecture, where all communication between set top box and mobile device(s) occurs in a peer-to-peer fashion, without specific usage of the intermediary messaging server. Such architecture is generally applicable to deployments when set top boxes and mobile devices are connected to the same network, which supports broadcast or multicast discovery of devices and services. Set top box and mobile device are both connected to the same local access network (LAN) such as home Wi-Fi network.

Figure 2:
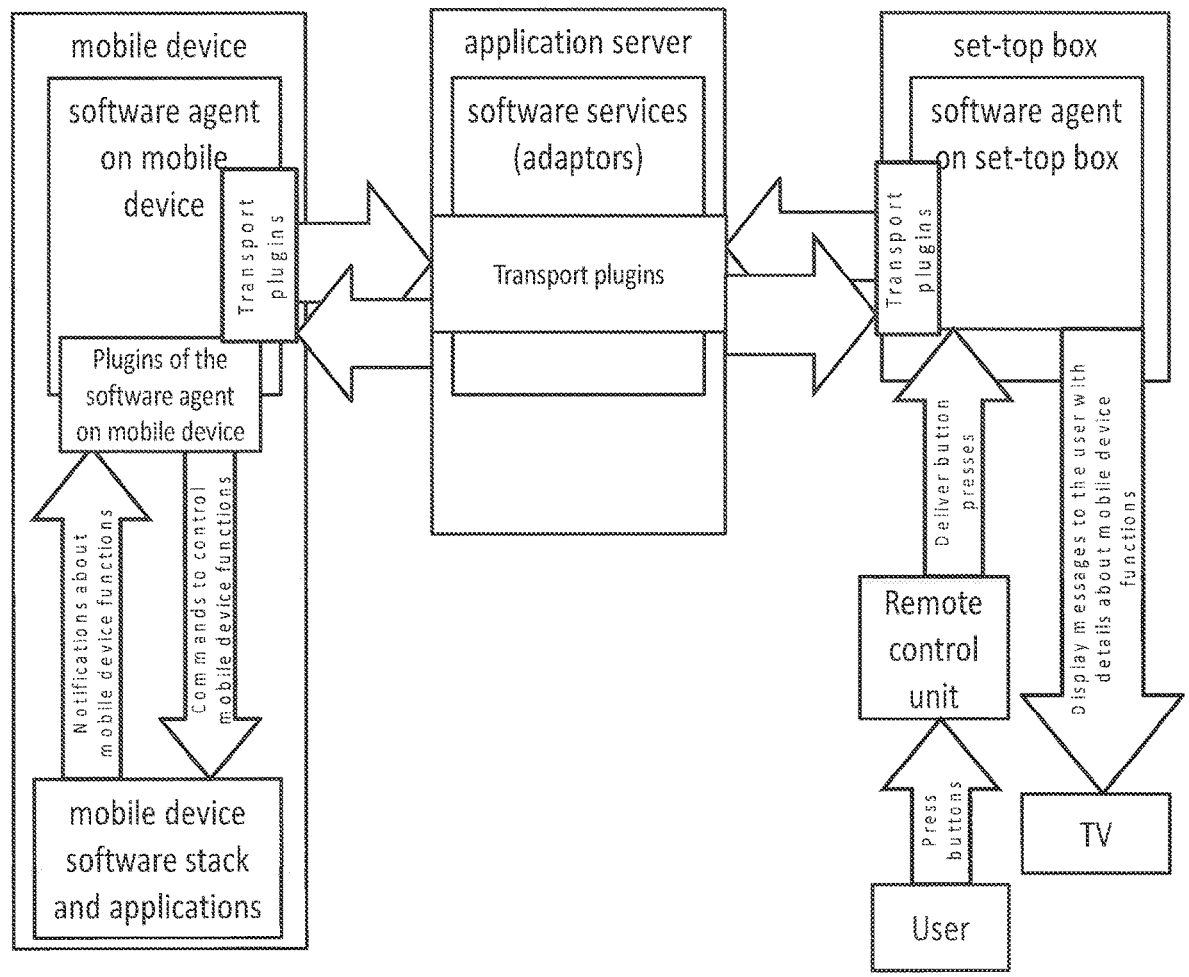
FIG. 2 is a diagram illustrating system architecture with use of intermediary server middleware of another embodiment of the system and method of the invention.

Advanced messaging and network protocol translation is supported in the architecture illustrated in the embodiment of FIG. 2. The diagram of FIG. 2 refers to the deployment architecture that uses intermediary messaging server to facilitate communication between mobile device(s) and set top boxes.

Reference is made now to FIG. 1 disclosing the peer-to-peer deployment architecture. In this arrangement, TV Controller device is running Software Agent. Customer communicates with the TV Controller using remote control unit. Software agent is responsible for handling customer input and for rendering customer User Interface on TV Screen. Software Agent is then responsible for choosing a suitable network transport to deliver messages to and from paired Unmanaged Device. Communication between paired devices in the diagram of FIG. 1 is performed directly from device to device. Software Agent running on Unmanaged Device is responsible for the selection of the suitable network transport, sending and receiving messages to an underlying Unmanaged Software applications running on Unmanaged device.

FIG. 2 depicts the deployment architecture that uses intermediary messaging server to facilitate communication between mobile device(s) and set top boxes. In this arrangement, TV Controller device is running Software Agent. Customer communicates with the TV Controller using remote control unit. Software agent is responsible for handling customer input and for rendering customer User Interface on TV Screen. Software Agent is then responsible for choosing a suitable network transport to deliver messages to and from paired Unmanaged Device. Communication between paired devices on a diagram presented in FIG. 1 is performed through intermediary Application Server. Application server can perform message translation and other functions described in the diagram presented in FIG. 3 and described in detail in the next section. Software Agent running on Unmanaged Device is responsible for the selection of the suitable network transport, sending and receiving messages to an underlying Unmanaged Software applications running on Unmanaged device.

Description of the Unified Messaging System

One of the essential aspects of the invention is to provide a combination of the functional service domains and components enabling bi-directional communication, messaging and micro-services aggregation between TV controllers and unmanaged devices in the household. Some functional domains can be provided by the TV controllers and partnering mobile device, without intermediary messaging server. On the other hand, some functional domains, namely message transformation module or micro-services API gateway, can only be used in the deployment architecture using intermediary messaging server such as Zodiac Interactive's Advanced Messaging Solution (AMS). Some aspects of AMS have been disclosed by U.S. Pat. No. 9,037,667 issued to Leon Rivkin. The entire content of this patent is hereby incorporated in its entirety by reference.

Figure 3:
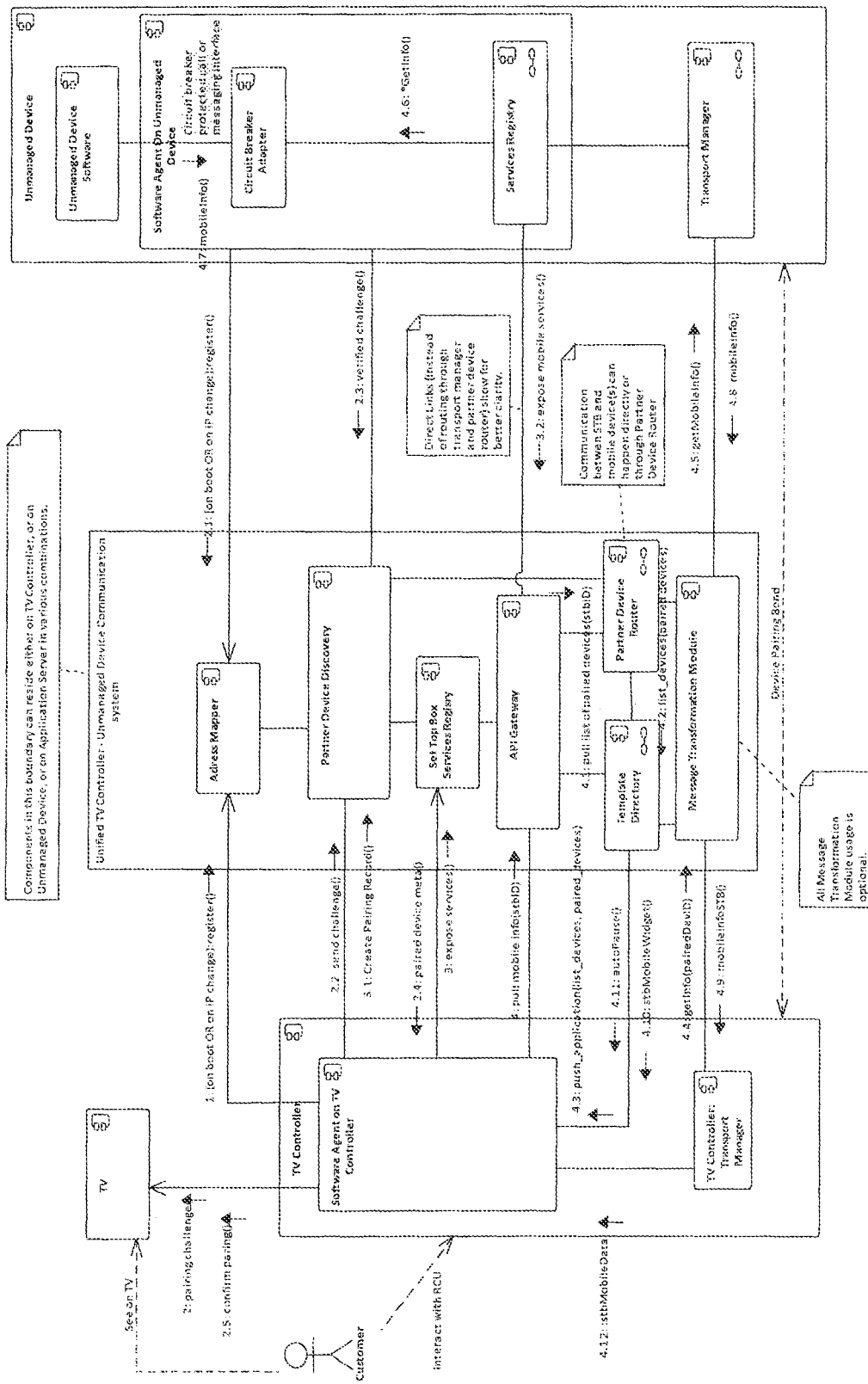
FIG. 3 depicts an example of a functional flow diagram of the system and method of the invention.

FIG. 3 depicts a diagram showing modules and interconnects as well possible examples of message flows illustrating interaction of the components constituting the invention. The message flows discussed in the application are provided mainly for illustrative purposes. Various alternatives of the message flows, not specifically discussed in the application, are within the scope of the invention.

Among the Messaging groups depicted in FIG. 3 diagram are the following:

Message Group 1.x—Registration of TV Controller and Unmanaged Device.

Message Group 2.x—discloses typical message flow implementing TV Controller and Unmanaged Device pairing process.

Message Group 3.x—discloses component interconnections used by TV controller and Unmanaged Devices to make software components on both TV Controller and Unmanaged Device discoverable in fashion similar to micro-services discovery.

Message Group 4.x—discloses the abstracted message flow for one of the example use applications enabled by the present invention (i.e. TV Controller requests and receives information from one or more micro services exposed on the Unmanaged Device through pairing).

Message Group 1.X: Device Registration

Message group 1.x discloses applications where TV Controller and Unmanaged device create or update registration record in the following situations:

1. On device boot;
2. Software agent activation:
3. IP address change or other network change;
4. Successful completion of the Device Pairing process.

The purpose of the messaging flow is to register in the system current network address information for the device, to ensure reachability by the paired device or intermediary messaging server. Registration record will be persisted by the Address Mapper functional component of the invention. Address Mapper component of the Unified Messaging system may reside on intermediary Messaging Server, such as disclosed by the Rivkin patent, or directly on the TV controller or Unmanaged Device depending on the embodiment of the invention. In the server less deployment option, registration message flow requires the pre-existing device pairing record. Detailed description of this messaging group is also provided in the Address Mapper section of the application.

Message Group 2.X: Expose Available Services Through Services Registry

Message group 2.x provides typical interaction between functional components exposing available micro-services through the Service Registry functional component, which will be disclosed in greater detail in the description of Service Registry component, later in the application. TV Controller, being managed device, in a typical deployment is not a subject to frequent dynamic changes in the exposed micro-services. Therefore, TV Controller Service Registry is typically hosted and provided on the intermediary messaging service and is available as centralized directory. As opposed to TV Controller, services exposed by Unmanaged Devices are subject to frequent changes. Thus, in a typical deployment, Unmanaged Devices Service registry is distributed on the unmanaged devices themselves. API Gateway and Partner Device Router are components of the invention providing abstracted access to the services of the Unmanaged Devices.

As to the message flow, Message group 2.x has only two messages expose managed services and exposed mobile services. The difference between the two is that managed devices typically expose services through centralized Services Registry (message 2) and unmanaged devices typically have distributed Services registry (message 2.1). Such deployment consideration is driven by dynamic and uncontrollable availability of unmanaged software applications.

Message Group 3.X: Typical Device Pairing Process

Messaging group 3.x provides message flow and interaction of the components for one typical PIN challenge/response implementation of the invention.

The following are the initial requirements to the system to initiate the message flow. TV controller is being booted, software components are loaded and network connectivity is available. Message group assumes device registration has been performed against Address Mapper component (typically deployed on the intermediate messaging server). Direct pairing typically uses network broadcast mechanisms. Consumer, TV Controller, TV and Unmanaged Device should be located at the same physical location allowing direct screen visibility.

As to the message flow, all message communications illustrated in FIG. 3 and described below pass through Message Transformation Module, through pluggable Message Transport Managers, which may select a network transport most appropriate for the network conditions and type of the device engaged in the message interchange. All direct communication links in the diagram of FIG. 3, are subject of the above conditions.

In the diagram of FIG. 3 the message flow for the message group 3.X is as follows: (1) Customer invokes Pairing mode on TV controller using RCU (opposite direction from Unmanaged Device to TV Controller is also possible but not substantially different). (2) PIN/Challenge Phrase is displayed on TV ad described by message 3. (3) Software Agent running on TV Controller sends message to Partner Device Discovery Module, (see corresponding FUNCTIONAL COMPONENT section), where persistent record with the certain expiry timeout is created (message 3.1). (4) Customer invokes Pairing mode on Unmanaged Device and enter PIN/Challenge Phrase. Software Agent on the Unmanaged Devices sends verification message to Partner Device Discovery Module (message 3.2), where PIN/Challenge entered on mobile device is verified. (5) Assuming successful validation, Paired Device meta-information is forwarded back by Partner Device Discovery Module to the TV Controller (message 3.3). (6) Software Agent on TV Controller creates confirmation dialog and displays it on TV. (7) Upon confirmation by Customer (message 3.4) message 3.5 is sent to Partner Device Discovery Module to persist device pairing record and to (optionally) update address mapper record.
Message Group 4.X: Typical Device Pairing Process Message Group 4.X describes message flow through the functional components of the system of the the invention. This message group is an example application, wherein TV Controller pulls some information from one or more of the applications running on one or more of the Unmanaged Devices.

The following are the initial requirements to the system to initiate the flow for the message group 4.X. TV Controller and Unmanaged Device(s) are registered, having Software Agents installed and network connectivity being established. TV Controller is paired to one or more of the Unmanaged Devices participating in the message flow. Both Message Template (for data interchange) and Application Templates are available in the Template Directory registry (see the description of FUNCTIONAL COMPONENT: TEMPLATE DIRECTORY for greater detailed information).

In the diagram of FIG. 3 the message flow for the message 4.X is as follows: Customer invokes one of the applications available through API Gateway (refer to the corresponding FUNCTIONAL COMPONENT section). Pull mobile info (abstracted. Can be anything e.g. weather data from one of the mobile devices) messages 4 is sent to API gateway. Id of the TV Controller is passed as parameter. API Gateway polls Partner Device Router (refer to the corresponding FUNCTIONAL COMPONENT section) to retrieve list of the Paired Devices for the given TV Controller from Partner Device Discovery Module as described in message 4.1. It is assumed that message format does not require transformation, therefore list of the paired devices is passed directly to Template Directory Component. Partner Device Router, may execute additional business logic for the automatic or semi-automatic selection of the paired Unmanaged Device (see the description of PARTNER DEVICE ROUTER functional component).

API Gateway synchronously instructs Template Directory Component (see the description of TEMPLATE DIRECTORY functional component) to generate and push to the TV Controller widget application capable of displaying dynamic listing of the currently paired devices. Widget application is generated by Application template generator and complemented by the list of devices metadata as described in message 4.2. Application and metadata are then pushed back to the Software Agent running on TV Controller as presented in message 4.3.

Customer interacts with TV Controller using RCU and TV Screen and accepts or modifies suggested Paired Device. Message 4.4 is then sent using TV Controller Transport Manager toward Message Transformation Module of the invention (need for message/protocol translation is assumed for the illustrative purposes).

Translated message 4.5 is then sent to the Unmanaged Device Services Registry using Unmanaged Device Transport Manager as network transport.

Service Registry on Unmanaged Device translates call into at least one (or potentially series), or notifications received from the Unmanaged Device Software as described by message 4.6. Circuit Breaker Component (refer to the corresponding FUNCTIONAL COMPONENT section) of the inventive system is used to protect sensitive API calls or break execution sequence quickly if one of the needed micro-services is not responding.

Resulting mobile info returned in message 4.7 is then travelling back to Message Transformation Module (message 4.8) using network transport designated by Unmanaged Device Transport Manager.

Message Transformation Module transforms message (need for transformation assumed for illustrative purposes) and invokes Template Directory Components for retrieving an appropriate Message Template.

Resulting transformed message is sent back to TV Controller Transport Manager as message 4.9 followed by the TV Controller Application template generated by Application Template Generator in Message 4.10. Immediately following the application template push as outlined in message 4.10, Application Template Generator may also send Automatic Pause message 4.11, switching TV Controller into time shift TV recording mode and allowing customer to interact with activation using remote control unit. Live TV channel is put into pause mode.

Transport Manager passes translated message 4.11 to TV Controller Software Agent combines message 4.11 with application template 4.10 and executes the application template, resulting in display of the requested mobile information on TV Screen.

Each of the presented functional service domains is reviewed below in greater details.

Functional Component: Address Mapper

As depicted in at least FIG. 3, Address Mapper is a functional component of the invention which keeps record of the TV Controller or Unmanaged Device IP or fully qualified domain address up to date. In Address Mapper records are normally updated on upon reaching the following events:

1. On booting/rebooting of the device;
2. Software agent activation;
3. IP address change or other network change;
4. Successful completion of the Device Pairing process.

Partner Device Discovery functional component illustrated in FIG. 4, and discussed later in the application, may consult Address Mapper component to retrieve current network address of the Paired device. Information containing up to date network address of the Device can then be passed to Partner Device Router for message routing. The invention does not mandate usage of IP address as mandatory attribute of the registered device. Use of other network addressing schemas (e.g. Dynamic DNS record or various network address translations mappings) are within the scope of the invention.

Functional Component: Partner Device Discovery

Figure 4:
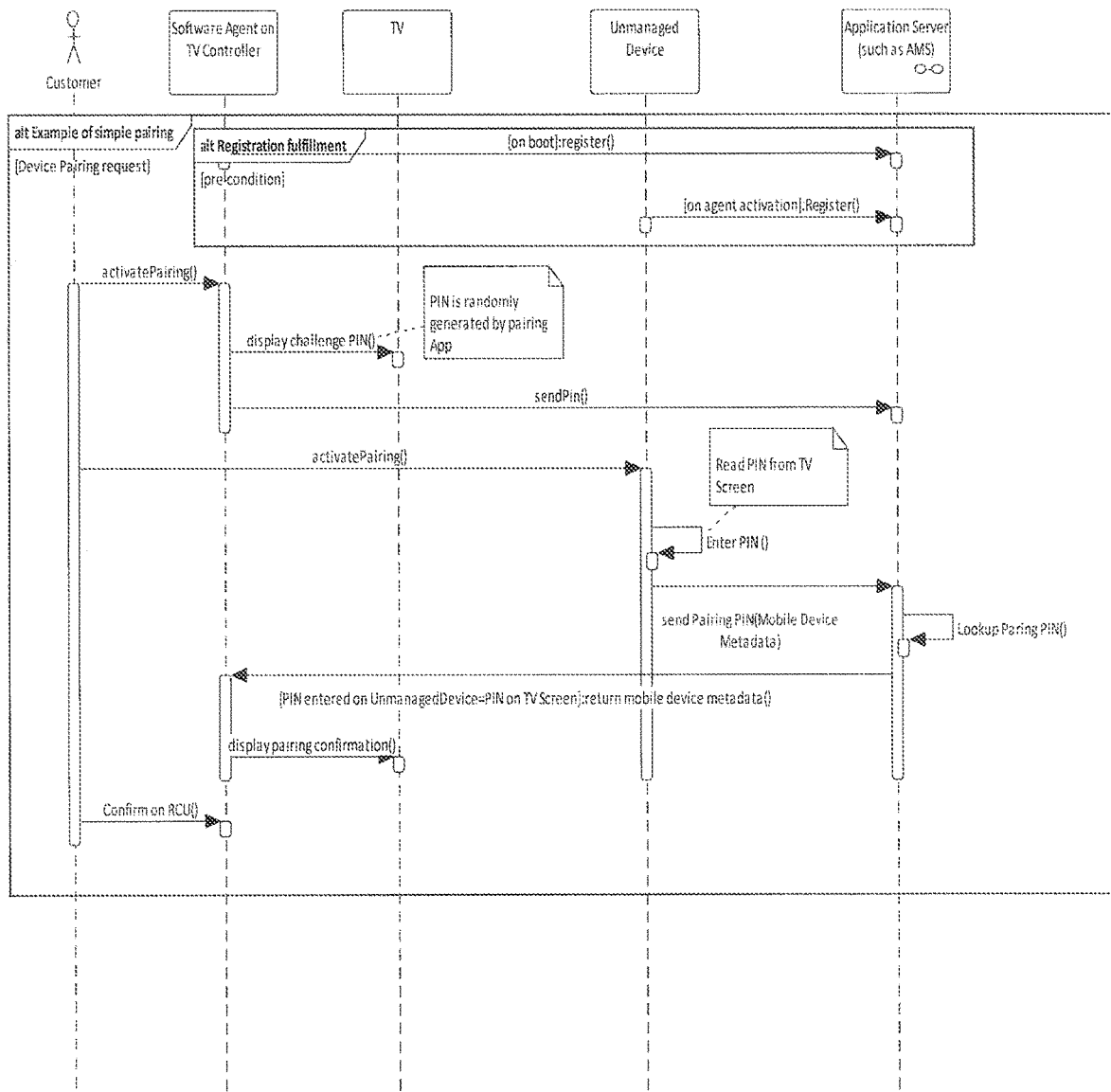
FIG. 4 depicts a system diagram of an example of PIN based partner device discovery of the invention.

FIG. 4 depicts a system diagram of an example of PIN code based partner device discovery functional component. Partner device discovery is relatively simple when both devices are connected to the same Wi-Fi home network. In such case, standard broadcast oriented discovery mechanisms can be used for pairing on the set top box and mobile device. Set top box and mobile device will perform network handshake without the need of registration server.

In practice, such deployments are not frequent, as mobile devices are often connected to cellular network only. In addition, most Cable Service Providers do not allow direct connectivity from the set top boxes to the public Internet (or even home Wi-Fi network) as part of the "walled garden" network where set-top boxes are only allowed to communicate with authorized services typically residing in backends and head-ends that are strictly controlled by said service providers. For such cases, intermediary messaging server which terminates messaging to and from set top boxes is necessary for (a) pairing set-top boxes and mobile devices and (b) relying messages between the two.

Several examples of pairing options include:
Federated authentication (using Operator or social network login) through services such as JainRain.
SAML or OAuth authentication.
Simple PIN challenge/response handshake.

As a functional domain, Partner Device Discovery mechanism does not stipulate any particular implementation. Mechanism presented in the system of the invention stipulates primarily creation of the pairing record describing existing device bond, as described in the section explaining message group 2.x.

The diagram of FIG. 4 depicts sequence diagram of one form of the challenge PIN based device discovery. The following are the initial requirements and assumptions for application of the Partner Device Discovery functional component. Both managed and unmanaged devices have network connectivity and have Software Components constituting the invention installed and running. It is assumed customer activates pairing mode on TV controller first, followed by activation mode on Unmanaged Device. Reverse mode of operation is also within the scope of the invention. Invention embodiment using Application Server is assumed. First two messages of FIG. 4 diagram illustrate registration process for TV Controller and Unmanaged Device respectively and are marked as condition for successful pairing.

Referring now specifically to FIG. 4 illustrating the Discovery Flow process. (1) Customer activates Pairing mode on TV controller. Software agent running on TV Controller generates random challenge PIN and displays it on TV. Generated PIN is set to Application Server (see for example AMS server discussed above). PIN has expiry period. (2) Customer activates paring mode on Unmanaged device then reads challenge PIN from TV screen and enters it on Unmanaged device. (3) PIN entered in a previous step is sent to Application Server where it is matched with the unique pin generated by TV controller. If successful match is found, pairing is considered completed. Pairing metadata is sent to the Application server and confirmation message is displayed on TV screen and acknowledged by customer.

Typical partner device discovery will use enriched set of metadata providing information on the unmanaged device or TV Controller itself, as well as ownership association of the mobile device to a certain member of the household. Such association will be used in the intelligent device routing function described below.

Hybrid model of operation, where two devices are paired on a local network and then pairing record is persisted on the intermediary messaging server is also possible. Hybrid model of operation allows devices to retain pairing bond even when set-top box and mobile device are connected to different networks.

Functional Component: Transport Manager

Figure 5:
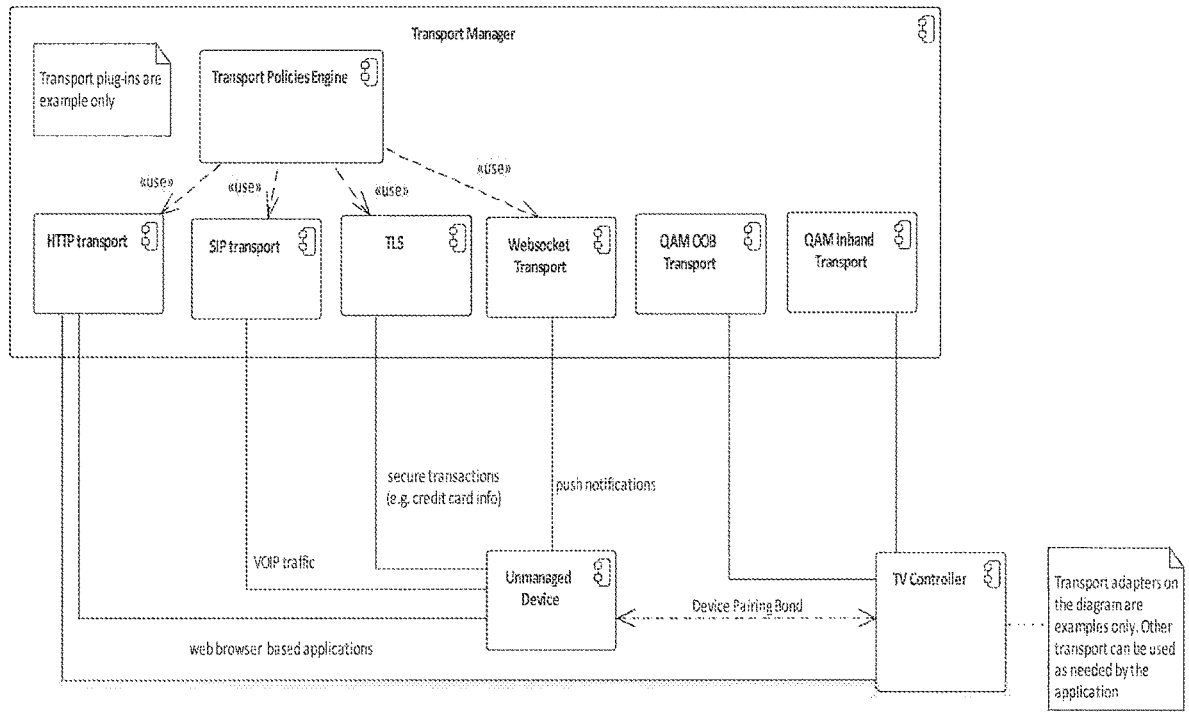
FIG. 5 is a system diagram of a transport manager functional component of the system and method of the invention.

FIG. 5 depicts a system diagram of a transport manager, which is one of the essential functional components of the invention. Among the essential units of Transport manager are the elements discussed below. Transport Policies Rule Engine, which primary function it is to define the set of rules declaring priority and usage restrictions of each transport available through transport plugins. (Example: for any trading application, Transport Policies Rule Engine may enforce use of TLS transport. As Described on the diagram TV Controllers and Unmanaged Devices can use various transport adaptors for different purposes. Multiple transport plugins implementing current and future network transports.

One of the essential aspects of the invention is that the transport manager deployed as part of software agent on the unmanaged device, used in combination with the Message Transformation Module, is used to extend functionality of the TV controller and consequently TV viewing experience with functionality which is not normally available on TV. One example of such functionality is voice transports (SIP for VoIP).

Implementation of the transport manager policies and selection of the transport plugins varies significantly depending on the following factors: Service Operator network topology; TV Controller and to a lesser extent Unmanaged Device hardware, software and available network connectivity; and Software Application in scope.

The diagram of FIG. 5 depicts one of the embodiment of how the Transport Manager can be configured and discloses selection of the network and message transports. Other embodiments are within the scope of the invention. One illustration of the functionality of the Transport Manager, as applicable for the Use Application 6 (Save Advertiser to Phone Book) is described later in the application. Hypothetic network constraints of fictional Service Operator ACable and hardware limitations of TV controllers are considered.

The following are the initial requirements to the system to initiate the process flow for application of the Transport Manager functional component. (1) Service Operator "ACable" provides Linear TV services to TV devices connected to the hybrid fiber-optics/coax (HFC) network using TV controllers. (2) ACable TV Controllers do not have broadband connectivity to the network and their connectivity is limited to DAVIC or ALOHA QAM based in-band and out-of-band IP channels. (3) Practical implication of the previous assumption 2 are as follows: The only channel having sufficient bandwidth for delivery of data to TV controller is in-band QAM channel, that is information must be packed into data PID of MPEG transport stream. (4) Out-of-band IP channel of the management controller is constrained and network spike sensitive. (5) Use Application 6 illustrated in FIG. 18 (saving advertiser to a phone book function) assumes potentially extremely high concurrency, if advertisement metadata is to be delivered during live broadcast of special high viewership events. (6) HTTP, QAM inband (publishing to MPEG TS through video multiplexor), QAM carousel out of band publishing are configured and allowed on the Transport Manager.

The following is one embodiment of the Transport selection flow by Transport Manager, which is configured in transport policies matching ACable network design template.

1. For the flow 2 as presented in FIG. 18 (saving advertiser to phone book) Transport Manager select QAM in-band transport (that is advertiser metadata will be packed into data pad of MPEG video stream, to allow concurrent delivery to multiple TV controllers tuned to a channel).
2. Template of the application, generated by Application Template Generator (part of Template Directory (see FIG. 11) is used by the Software Agent to present a dialog on TV screen allowing push of the advertiser contact information to a mobile device, and selection of the target mobile device using Partner Device Router (see FIG. 7). This template is not changing frequently and is not individually customized per TV Controller, therefore, Transport Manager will choose out-of-band QAM carousel transport for delivery of the application template facilitating the flow according to arrow 3 in FIG. 18.

3. The flow according to arrow 5 in FIG. 18, requires real time delivery to display confirmation message, so Transport Manager will choose RUDP transport from TV Controller to Application server to avoid overwhelming extremely constrained DAVIC/ALOHA QAM out of band transport. Message Transformation Module (see FIG. 10) will convert message to HTTP, and Server Transport Manager will deliver request to Unmanaged device using HTTP transport (see the flow according to arrow 5 in FIG. 18).

4. Returned confirmation message (see the flow according to arrow 6, FIG. 18) will be delivered to Application server via HTTP chosen by Unmanaged Device Transport Manager, will be transformed back to UDP packet by Message Transformation Module (see FIG. 10) and send to the TV Controller Transport Manager using RUDP transport.

Functional Component: Partner Device Router

Figure 6A:
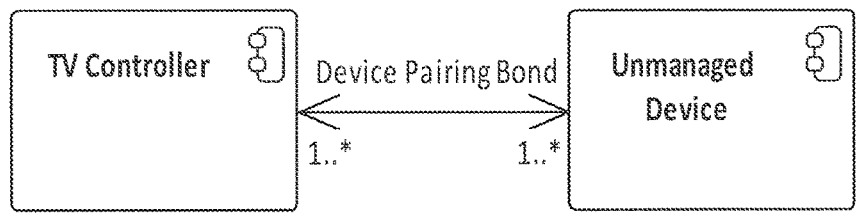
FIG. 6A is a diagram illustrating relations of the set-top box and mobile device as supported by the system and method of the invention.
Figure 6B:
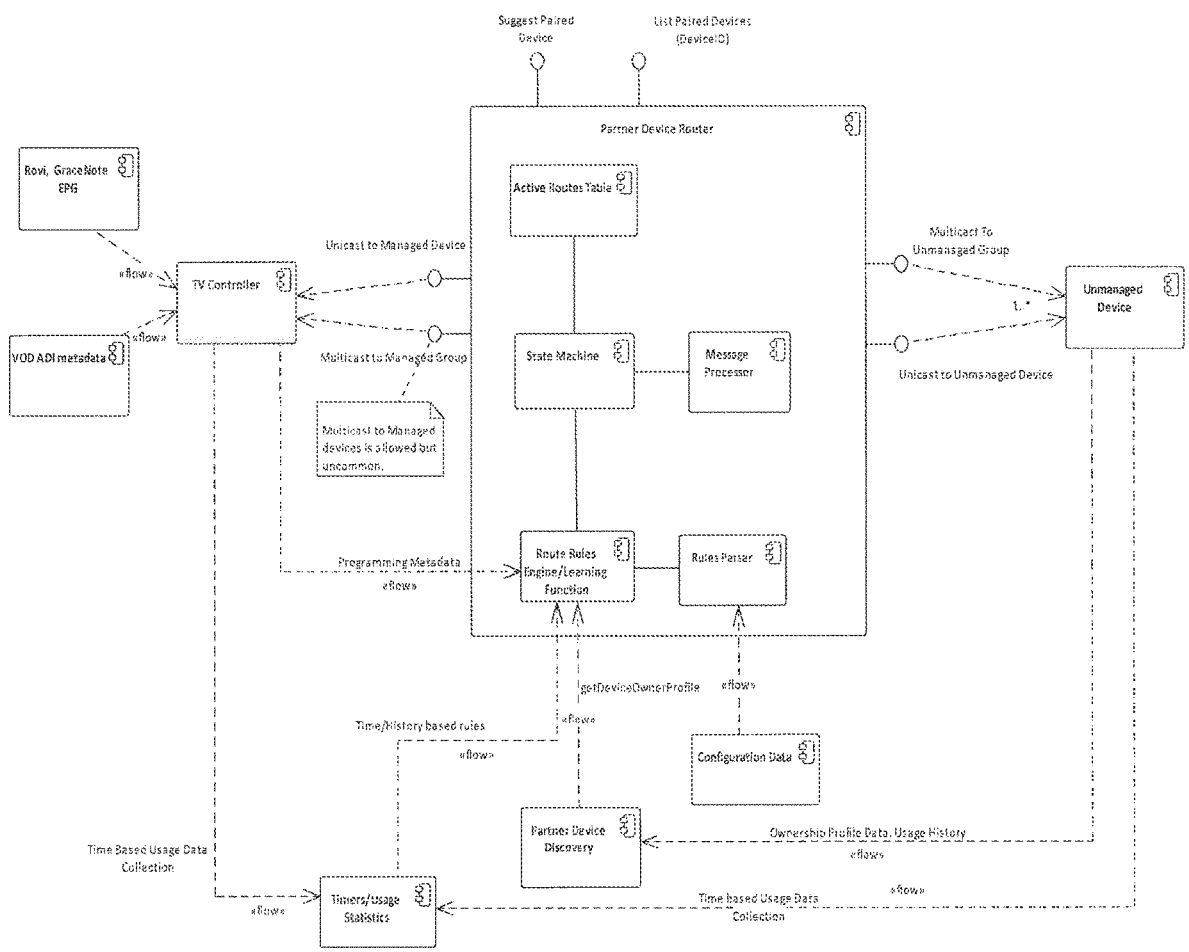
FIG. 6B is a diagram illustrating implementation of a partner device router functional component of the system and method of the invention.
Figure 6C:
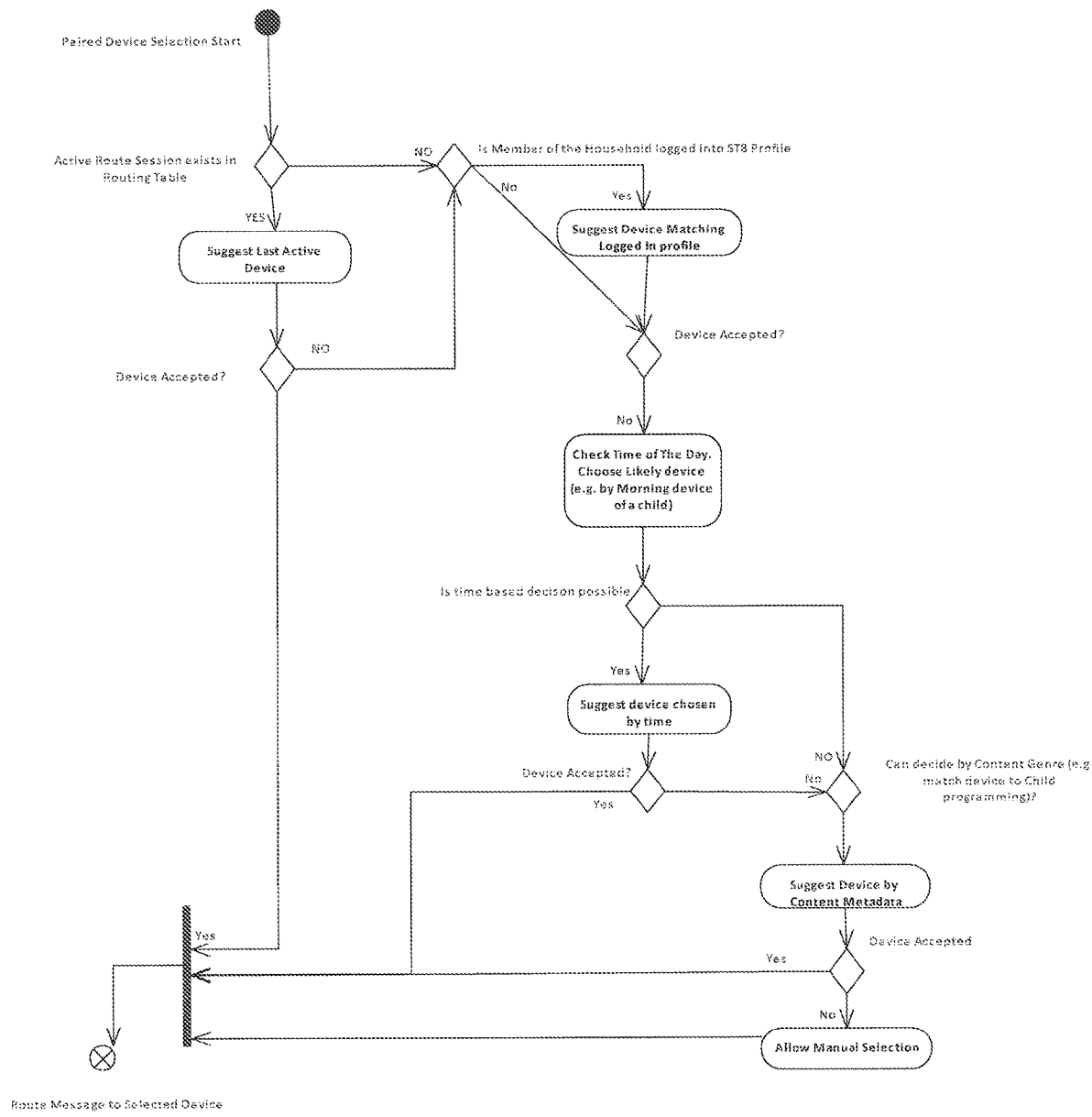
FIG. 6C is a diagram illustrating decision flow of the partner device router functional component of the system and method of the invention.

FIG. 6A depicts a diagram illustrating relations of the set-top box and mobile device, whereas FIG. 6B illustrates implementation of a partner device router functional component, whereas FIG. 6C illustrates decision flow of the partner device router functional component. One of the essential features of the presented invention is an ability to facilitate intuitive end-point selection and message routing between set top boxes and mobile devices. By nature, relationship between set top boxes and mobile devices in a household is "many to many" (that is each one of the many mobile devices can be paired to one or several or all the multiple set top boxes in a household). For the purpose of the described invention, way of communication between devices may not necessary be unicast messaging. For example, meeting invitation response for family members, responded via remote on TV can be forwarded to all mobile phones in the household).

As illustrated in FIG. 6B, Partner Device Router includes the following functional components:

Active Routes Table provides real-time list of the currently established messaging routes between managed and unmanaged paired devices. If there is such existing route (confirmed by the customer) it is assumed to have highest priority for intelligent route suggestion and is being offered first;

State Machine as name implies is a component which maintains route session logic for the life-cycle of the messaging route, from initial hand-shake to cleanup. This component ties all other components together;

Route Rules Engine/Learning Function is the component, which processes routing rules presented by the Route Parser. In addition, this component takes meta-data from TV controllers and Unmanaged Devices regarding current TV programming being watched, time of the day based usage statistics etc. Additional metadata is being used by decision making logic for preemptive intelligent target device selection, as described below.

Rules parser is responsible for parsing of the route rules presented in configuration data.

Diagram 6b, also shows perimeter components providing auxiliary data feeds facilitating routing decisions, such as time based usage data collection feed, TV programming metadata flow, configuration data. Said feeds do not constitute part of this invention and are not described here.

Partner Device Routing management performs the following essential functions of the invention:

Suggest Routing to a mobile device, which belongs to a person whose profile is currently active on a set top box.

Suggest Routing to a mobile device, which belongs to a person whose metadata profile (e.g. age or social profile) best corresponds to the metadata of the content being watched on TV (e.g. while watching children programming suggest routing to a mobile phone which belongs to an underage member of the household).

Time of the day based routing (e.g. do not suggest routing to a device belonging to a child ???? when current time is later than a configurable threshold.

Allow group "multicast style" routing of the messages (e.g. sent meeting invite to all mobile devices in a household).

FIG. 6C depicts the diagram illustrating decision flow of the partner device router functional component. This is an example of the decision logic for one Paired Device selection route flows.

Example routing flow assumes existing paired devices. If there is active and not expired route between managed and unmanaged device, —Partner Device Router suggests last used device as routing choice;

Otherwise, if any member of the household is logged into set top box, router will attempt to look up mobile device belonging to this person and suggest it as routing choice;

Otherwise, if obvious time of the date is possible (e.g. prefer device belonging to an underage person during morning hours), Partner Device Router will make such suggestion;

Otherwise, if decision is possible based on the video content metadata (e.g. children programming assumes routing to a device which belongs to an underage person), Partner Device Router suggests such route.

As the last resort customer is presented with the list of the paired devices to manually choose from.

Functional Component: Services Registry

Figure 7:
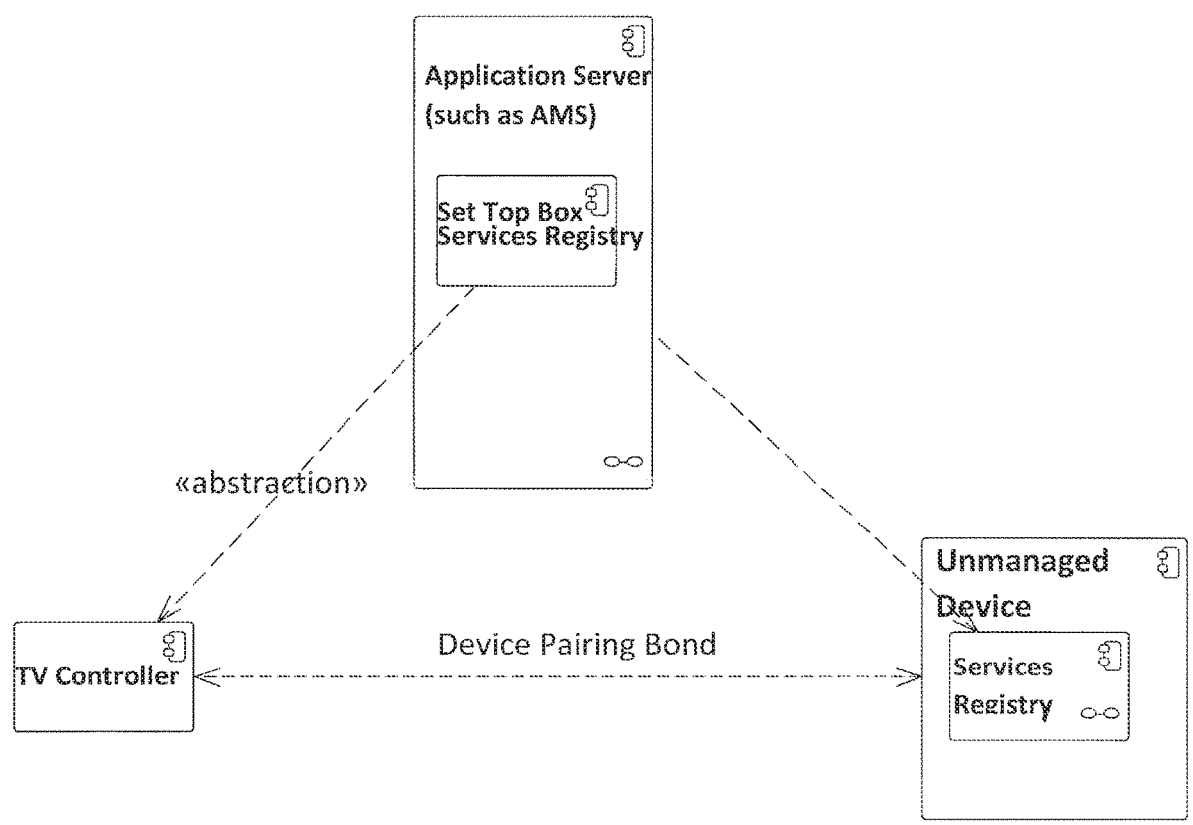
FIG. 7 is a system diagram of one embodiment of server-side implementation of the service registry functional component of the system and method of the invention.

FIG. 7 depicts a system diagram illustrating a typical deployment of the Service Registry component in the deployment architecture with middleware messaging server. Both mobile devices and set top devices, for the scope of the presented invention, can be defined as devices providing multiple micro-services. In its broadest scope, the perceived goal of the invention is establishment of the bi-directional communication between arbitrary number of the devices, discovery of the micro-services provided by each one and consummation of the micro-services by application running on any given device. Specifically, to entertainment industry—inventive nature of the described mechanism is the proposed method of creating distributed composite micro-services based software combining functionality of managed TV Controllers and unmanaged devices.

In its simplest degraded form, each application, running on either mobile device or set top box, provides one and only service which is consumed by one and only application running on the paired device. Services Registry is functional component of the present invention which exposes collection of the available micro-services and interfaces available on either mobile device or set top box to a paired device.

Since mobile devices are predominantly unmanaged devices, combination of the available services, messaging data models and templates can vary significantly during mobile device lifecycle, therefore natural place for hosting Services Registry for mobile devices is mobile device itself, where repository of the available services is queried by the Mobile Device Software Agent dynamically. On the other hand, Set Top Boxes are managed devices and software changes on them are much less frequent. In a typical deployment architecture which includes intermediary messaging server, Set Top Box Services Registry will be hosted on the middleware server. For some use applications Application Server may also implement mobile device registry cache.

Diagram presented in FIG. 7 shows typical placement of the Services Registry components, showing centralized deployment for Managed Services Registry and distributed placement of the Managed Services Registry. Centralized Managed Services Registry abstracts and aggregates instances of the individual Managed Devices, where Unmanaged Services Registry is accessible directly on multiple Unmanaged Devices. FIG. 7 illustrates a principle of hybrid deployment schema of the Services Registry. Functions of the Services Registry are also described below and illustrated by FIG. 8 and FIG. 9.

In a simple deployment shown in FIG. 1 (server-less model), Services Registry for both mobile devices and set-top boxes resides on the corresponding device. In complex use cases, more than one of the exposed micro-services can be used by the use application. To facilitate micro-services aggregation, Services Registry for both set top box and mobile devices implements circuit-breaker protection design pattern typical for the distributed micro-service oriented architecture. Diagram of FIG. 8 illustrates an example of Service Registry component breakdown for the mobile device, as presented in the invention.

Figure 8:
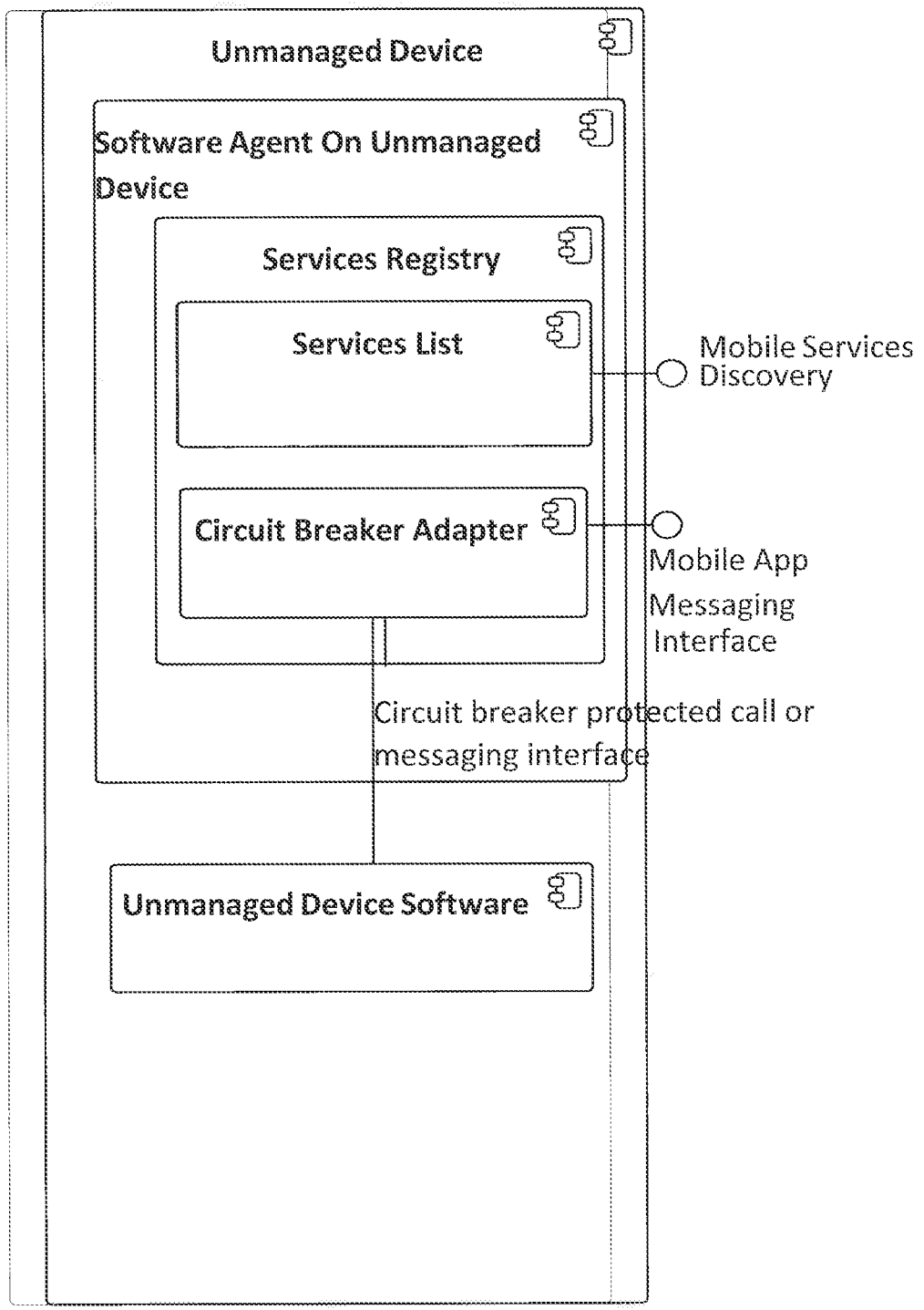
FIG. 8 is a system diagram of one embodiment of client-side (on a mobile device) implementation of the service registry functional component of the system and method of the invention.

Example Service Registry component design presented in FIG. 8, is provided for the Services Registry on the mobile device. Among the elements of the Service Registry are:

Services List allows consumer application to retrieve list of the available services, as well as obtain description metadata for each provided service.

Circuit Breaker Adapter is a software design pattern, used to detect failures and provide encapsulation logic of preventing a failure to reoccur constantly. Circuit Breaker can also be used to isolate non-essential failures, when designing a composite best-effort micro-services based application.

As presented, Service Registry exposes two interfaces:

Mobile Service list interface allows discovery of unmanaged micro-services. An example of such implementation will be industry standard Universal Description, Discovery, and Integration (UDDI) specification for SOAP web services, coupled with Web Services Description Language (WSDL) mechanism for discovery of SOAP based web services provided by Software Agent on Unmanaged Device (Note: Other technologies can be used as well).

Mobile Application Messaging Interface allows consumption of the actual provided micro-services protected by Circuit Breaker Adapter.

Figure 9:
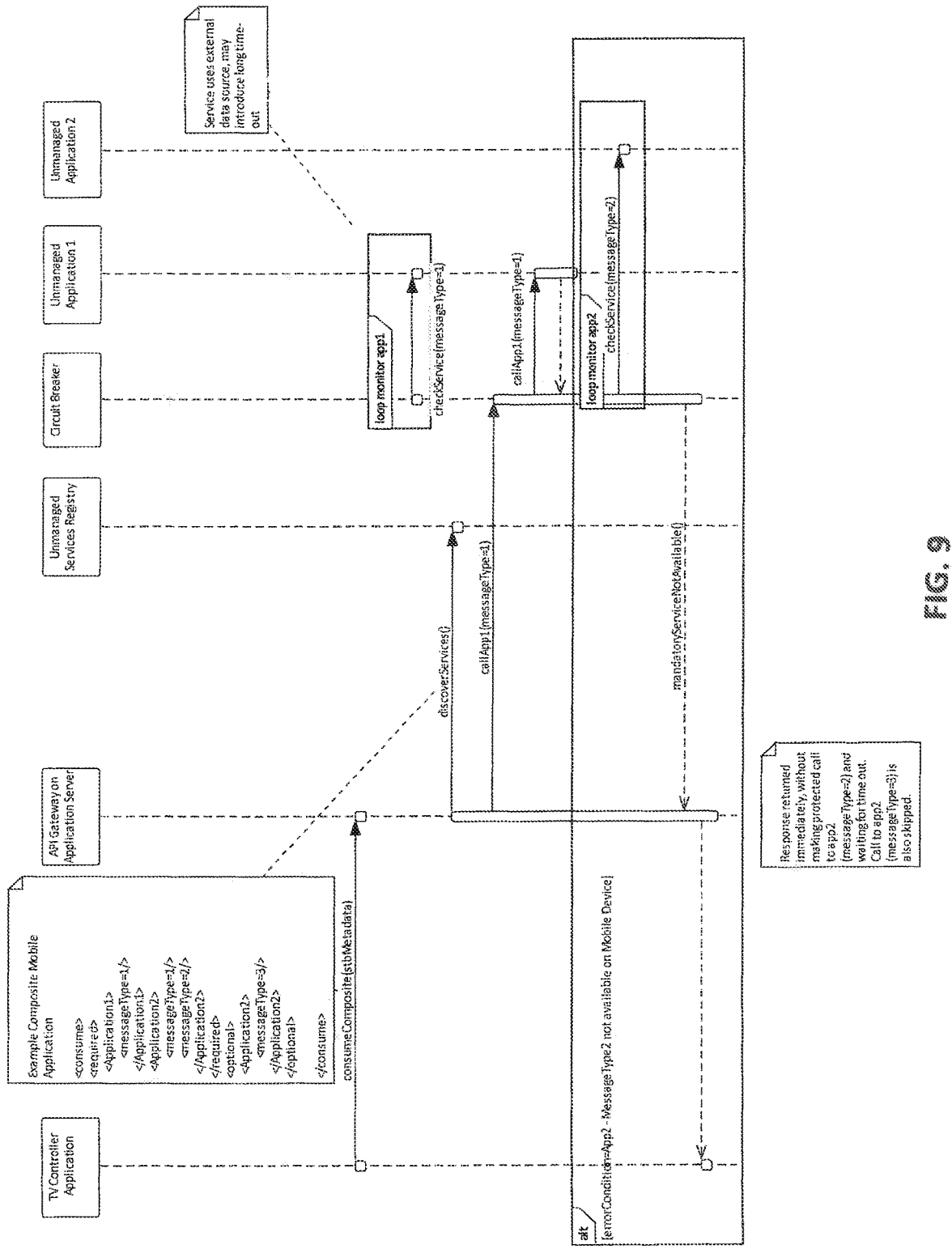
FIG. 9 depicts one embodiment of a message flow diagram related to the service registry functional component of the system and method of the invention.

FIG. 9 illustrates the message flow for the composite (complex use case) consumption scenario where set top box application requires certain message types from several mobile applications. Sequence diagram presented in FIG. 9. Illustrates use of the Circuit Breaker by API Gateway Component Adapter as part of the Services Registry.

The following are the initial requirements and assumptions for the composite (complex use case) consumption scenarios:

Sequence diagram represents hypothetical application consuming more than one available micro-service available as part of Unmanaged Application1 and Unmanaged Application 2 running on Unmanaged Device.

Circuit Breaker Adapter is employed to constantly monitor essential (mandatory) services provided by the Unmanaged Applications 1 and 2. Services provided by these applications are assumed to use external data source and may introduce long time-outs.

Composite micro-services based Application running on TV controller requires MessageType1 from Unmanaged Application1, MessageType1 AND MessageType2 from Unmanaged Application2, where MessageType3 from Unmanaged Application2 is optional.

Sample application manifest provided:

```
<consume>
    <required>
        <Application1>
            <messageType=1/>
        </Application1>
        <Application2>
            <messageType=1/>
            <messageType=2/>
        </Application2>
    </required>
    <optional>
        <Application2>
            <messageType=3/>
        </Application2>
    </optional>
</consume>
```

One of the embodiments of message flow for the composite (complex use case) consumption scenarios is provided below:

1. TV Controller reaches out to API Gateway running on Application Server (see FIG. 10) which is abstracting access to multiple unmanaged applications under same namespace with consumeComposite passing stbMetadata as parameter.
2. API Gateways performs service discovery against Unmanaged Services Registry and discovers services to be consumed (as per example manifest posted above)
3. Mandatory call is being made callApp1 (messageType=1) through Circuit Breaker Adapter to Unmanaged Application 1. Call monitoring performed by Circuit Breaker does not indicate failure, so call is passed through to the application and returns some reply.
4. As shown in FIG. 9 Loop Monitor App2, is indicating failure of the mandatory service, so Circuit Breaker Adapter, breaks execution and returns failure message mandatory Service Not Available through API Gateway to TV Controller immediately, avoiding potentially long time-out period. Error Handling is activated on TV Controller.

Functional Component: API Gateway and Message Transformation Module

Figure 10:
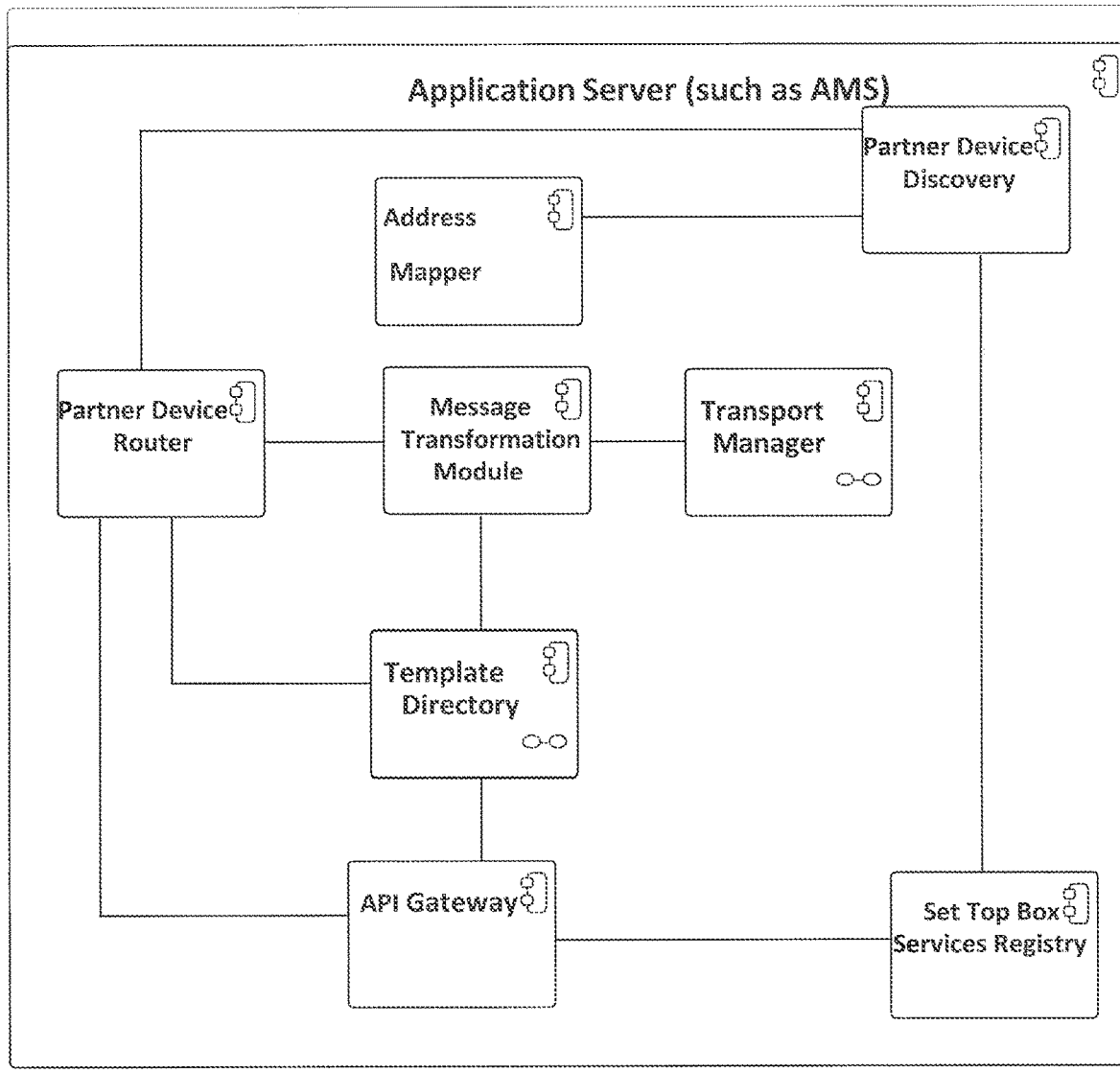
FIG. 10 depicts a system diagram of intermediate messaging server of the system and method of the invention.

FIG. 10 depicts a system diagram which includes Application Server providing API Gateway and Message Transformation Modules for complex user cases. For complex use cases where single application on the mobile device consumes services from multiple applications on the set top box, or where single application on the set top box consumes multiple services or messages from multiple applications running on a potentially multiple mobile device, the Application Server such as Zodiac Interactive's AMS may provide API Gateway and Message Translation Module components.

Diagram of FIG. 10 is provided to illustrate which components of the invention are typically deployed on the Application Server, should embodiment of the invention choose to use such server. Interconnects between components match those provided in the detailed diagram of FIG. 3, and messaging and flows between components are not repeated here.

Main function of the API gateway in the system of the invention is to provide unified mapping of the available services and routing to the corresponding Service Registries on multiple mobile devices. API gateway may also maintain a set of business rules which define which services available through Services Registry can be combined together or need to be restricted in any way;

Message Transformation Module in the system of the invention is responsible for translation of the messages into formats which are not Internet friendly, or require aggregation/translation of information according to the defined business rules before delivery to the target device.

Message Transformation Module allows TV controller to leverage message transports which are not normally available on TV device (e.g. VOIP or SIP protocols for voice call disposition can be supported using Message Transformation Module to support generation and disposition of voice reply from TV Controller).

Functional Component: Template Directory

Figure 11:
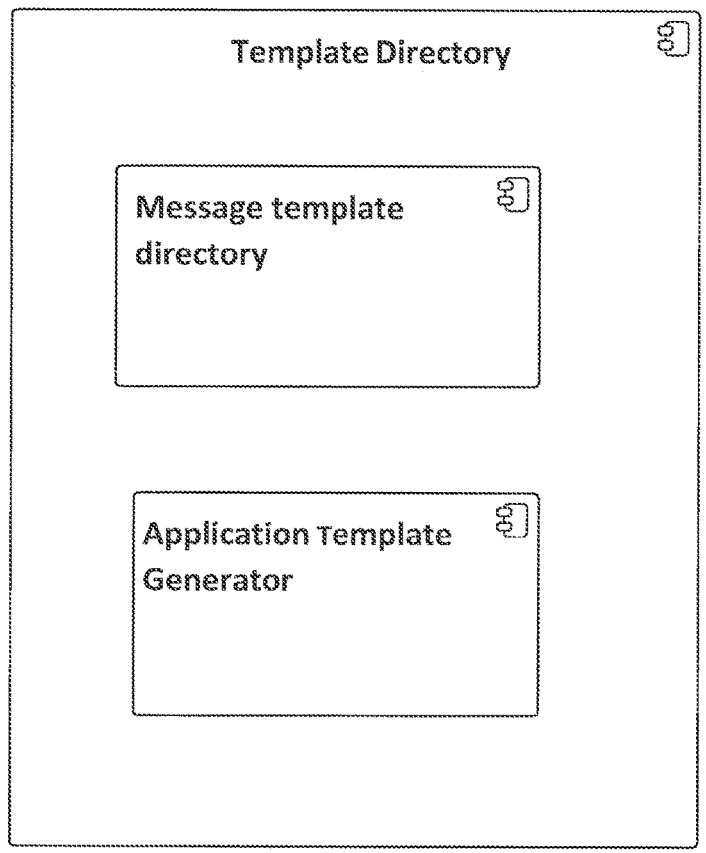
FIG. 11 depicts a system diagram of a template directory functional component of the system and method of the invention.

FIG. 11 depicts a system diagram of a template directory functional component. One of the industry challenges for designing distributed micro-services based software applications which cross managed and unmanaged devices boundaries, as described in the present invention, is maintaining up-to-date repository of the application templates. In the system of the invention, templates consist of two parts:

Message data model template for applications running on mobile devices; and

Mini application (widget) templates for defining interaction patterns with mobile applications.

Applications running on the mobile devices due to their unmanaged matter are subject to frequent changes in a course of software development lifecycle. Multiple applications may serve similar function but use different data models for messaging (e.g. mobile device can carry both Google Calendar and Apple Calendar applications which can be used to process meeting invitations. Applications can also use different messaging format such as vCal and iCalendar). Applications may also expand their data models or switch to a different messaging format.

Message Template Directory is a repository of the messaging formats for the known mobile applications covered by the inventive solution. Application Template Generator is a repository of the small application objects used as a mini-application providing service invocation dialogs on either set top box or mobile device. For example, application template may describe menu choices, remote control unit (RCU) key mapping and actions for the Incoming Message Use Application described below. Application template object carries both data properties and optionally behavioral data in a form of scripting fragments. Application template may use standard HTML/XML and JavaScript for formatting and actions respectively, or proprietary formats.

Template Directory is a hosting container defining functionality and data models of the applications making subject of this invention. Examples of the essential applications of the Template Directory are provided below. Other applications are within the scope of the invention.

Controlling mobile devices with through software agent on TV controller without interrupting viewing experience Extending managed devices functionality with services available on unmanaged devices (location sensors, VoIP and voice call disposition, SMS, weather sensors, microphone etc.)

Usage of unmanaged device as a way to personalize TV experience for choosing profile, leveraging unmanaged device using history, etc.

Extending functionality of the unmanaged device by leveraging feed of metadata available from TV Controller managed device (e.g. commercial or featured content metadata).

Application Template Generator is a functional component which generates 'render-able' an application which is typically executable on TV Controller. Inventive nature of this component is that application is generated on the fly from the template upon arrival of the corresponding message from the unmanaged device and then pushed to TV controller. Reverse mode of Operation (when application is generated and pushed to mobile device) is also supported. In one embodiment of the system of the invention the Template Directory is hosted on a managed service. Template Directory can be hosted on the Application Server or use third party repository for the server-less deployment as illustrated in FIG. 1.

Automatic Pause Option

Whenever the message is displayed on the TV screen about specific event on the mobile device, the user has options to (a) use remote control unit by means of key presses to select a desired option which will be converted to a command to be sent to a mobile device or (b) not use remote control unit and instead perform desired operations directly on the mobile device. In both cases the software agent on set top box can optionally pause the video being played or put on hold the dynamic application such as game.

Referring now to section "Message Flow 4.x" illustrated in FIG. 3 for the example embodiment of the automatic pause option. In scenario (a) the user uses the remote control unit to pause the video or put the application on hold by means of selecting the relevant options on the message displayed on TV about event on the mobile device. Referring now to the section "Use Application 4: Accepting Incoming Call" depicted in FIG. 15 for an example embodiment of the scenario (a).

In scenario (b) the software agent on mobile device detects the fact of user operation with the phone and sends a notification to the software agent on the set top box in which case the software agent on set top box will automatically pause the video or put dynamic application on hold automatically for user.

Refer to the section "Alternative Use Application 4: Incoming Call 2" depicted in FIG. 16 for an example embodiment of the scenario (b).

For both scenarios, when user finishes their operations with the mobile device and returns to set top box, they have several options to continue with. For dynamic application on hold there are options to (a) continue the application from where it was put on hold, (b) restart application from the beginning, and (c) exit the application. For paused video there are options to (a) continue the video playback from the moment the message was displayed, (b) continue the video playback from the moment it was paused, and (c) continue the video playback from the current moment as being aired by the broadcast channel.

As a further variation of the automatic pause/hold, the resumption of the video playback or application execution can be also performed automatically. For this, the agent on the mobile device sends a message to the agent on the set-top box that activity required user's attention has completed and user has returned to the set-top box. Whether such automatic resumption will be performed, is configured by the user.

Ubiquitous Data Format

We are now referring to the section "Functional Component: Template Directory" depicted in FIG. 11. All messages sent to software agent on set top box from software agent on mobile device conform to the ubiquitous data format that comprises the appearance of the message on the TV screen including visual elements, text messages, size, colors, position, fonts, order, images, icons, background images, animation effects, etc. The message format also indicates which visual elements are interactive ones and which commands for mobile device are linked to each such interactive visual element. When user selects desired interactive visual element, e.g. "Send to voicemail" option for incoming phone call, the software agent on set top box will pick the command linked to said interactive visual element and send that command to software agent on mobile device for further forwarding for execution to appropriate application on the mobile device. Furthermore, the action bound to the said visual element on TV screen, can be a set of instructions to be performed on the set-top box.

The ubiquitous data format and relevant actions can be implemented using different technologies. For example, it can be HTML, CSS, and JavaScript or can be proprietary technology suitable for generating a dynamic user interface. Exact method of implementation is not in scope of the present invention.

The following sections of the application discloses exemplary functions of the present invention ("use applications"). These use applications are provided for illustrative purposes. Other applications, which are not disclosed in the application are within the scope of the invention.

Use Function 1: Pulling Information

Figure 12:
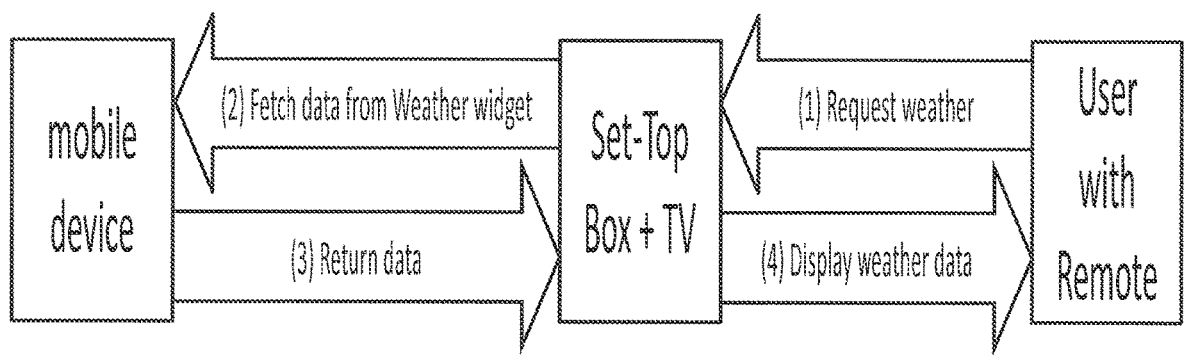
FIG. 12 is a block diagram illustrating pulling information function of the system and method of the invention.

The diagram of FIG. 12 depicts "pull information" function of the invention. A user may, for example, request a weather data. The actual method of request may differ depending on the decision of the product manager of the final product. As an example, one of the buttons of the remote control unit can be dedicated for this function; another example is a menu item along with other actions in said menu.

Upon pressing the key on remote control unit, software agent on the set top box sends a request to a mobile device to fetch the weather data. Software agent on the mobile device fetches current weather conditions from weather application or widget or other component that has weather data. Software agent on the mobile devices sends a message to the software agent on the set to box with weather data and information on how to present the data on the TV screen (formatting data). Software agent on the set top box presents weather conditions data on the TV screen using formatting provided with weather data in the response from the mobile device.

Use Function 2: Accept Invitation

Figure 13:
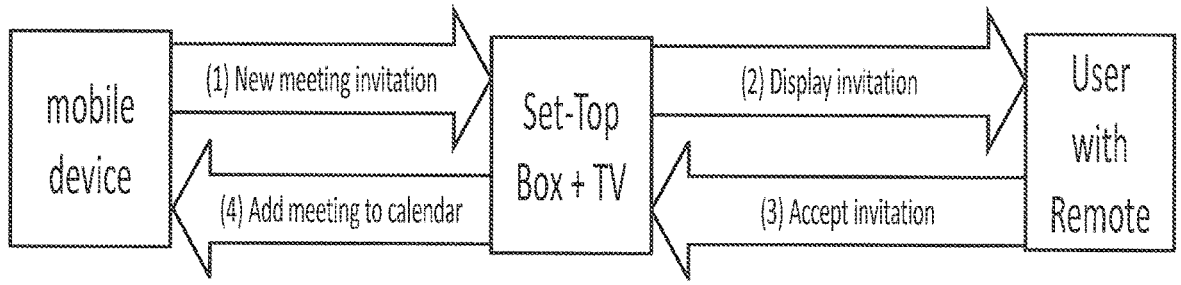
FIG. 13 is a block diagram illustrating accepting invitation function according to the invention.

The diagram of FIG. 13 depicts "accept invitation" function of the invention. In this application, initially email agent on the device receives a notification about new email with invitation and forwards the invitation details to the email agent on the set top box. Email agent on the set top box displays invitation details and options including "Accept" on TV. Then user decides to accept invitation and using keys of the remote control unit selects "Accept" on the screen, and presses OK remote button. Email agent on the set top box forwards the acceptance decision to the email agent on the mobile device. Eventually email agent on the mobile device adds the event to the calendar.

In this function an invitation, which comes with a user email, is being accepted by a user. The mobile device receives the email notification from a mail server. For example, if Google is a provider, Google server sends notification to the user's mobile device and to the email agent on the mobile device. The email agent on the mobile device receives the notification and forwards it to a set top box. The software agent on the set top box receives the notification and displays invitation information on TV screen for the user. The user observes incoming message on the screen and has several options including the options to reply to the message, delete the message, mark the message as read, mark the message as unread, and dismiss the message on the screen. If reply option is chosen, OK button on the remote control is pressed/activated generating a respective signal. The agent on/from the set top box receives the signal and sends back to the agent on mobile device the acceptance (signal/command). As a result, the agent on the mobile device notifies the email client that the invitation has been accepted. This notification immediately creates an event in the user calendar. The essence of this application is to provide the user with the ability upon receiving email with an invitation to have an option to reply without touching his or her phone, and instead to use the remote control for this purpose while watching TV.

Use Application 3: Send to Voicemail

Figure 14:
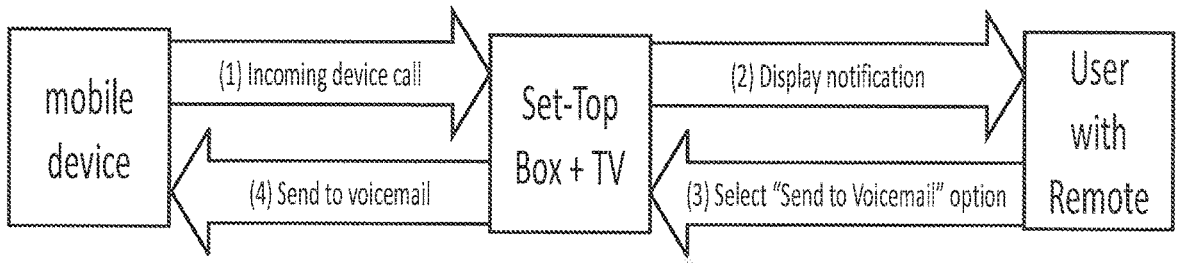
FIG. 14 is a block diagram illustrating sending to voicemail function according to the invention.

The diagram of FIG. 14 illustrates "send to voicemail" function of the invention. Mobile device receives an incoming phone call. Telephony agent on the device sends notifications about an incoming call to the software agent on the set top box. Set top box displays notifications to the user on the TV, the notification contains caller name and/or phone number and options including option to send to voicemail. User decides not to answer to the phone call, selects the option "Send to Voicemail", and presses OK button on the remote. Software agent on the set top box forwards user's selection to the telephony agent on the mobile device. Telephony agent on the mobile device commands the device to send the said incoming call to the voicemail. Device sends the caller to the voicemail.

This function relates to receiving an incoming phone call and directing caller to voicemail. For example, someone calls user on cell phone, the agent on mobile device receives a notification about this event, because it listens to all events including this one. It will send message to the agent on the set top box with all details, name, number etc. The agent on set top box displays the notification on the screen (similar to incoming call from John Smith with phone # and options you should reply, i.e., decline, accept, send message, send to voicemail, etc.). The user sees the notification and selects an option. This occurs by means of pressing keys on the remote control. The agent on set top box receives the press of button signal and sends command linked to the selected option on the screen to the agent on the mobile device instructing that this specific phone call to be re-directed to the voicemail. The call no longer exists in the phone and the caller will be communicating to voicemail server.

Use Application 4: Accepting Incoming Call

Figure 15:
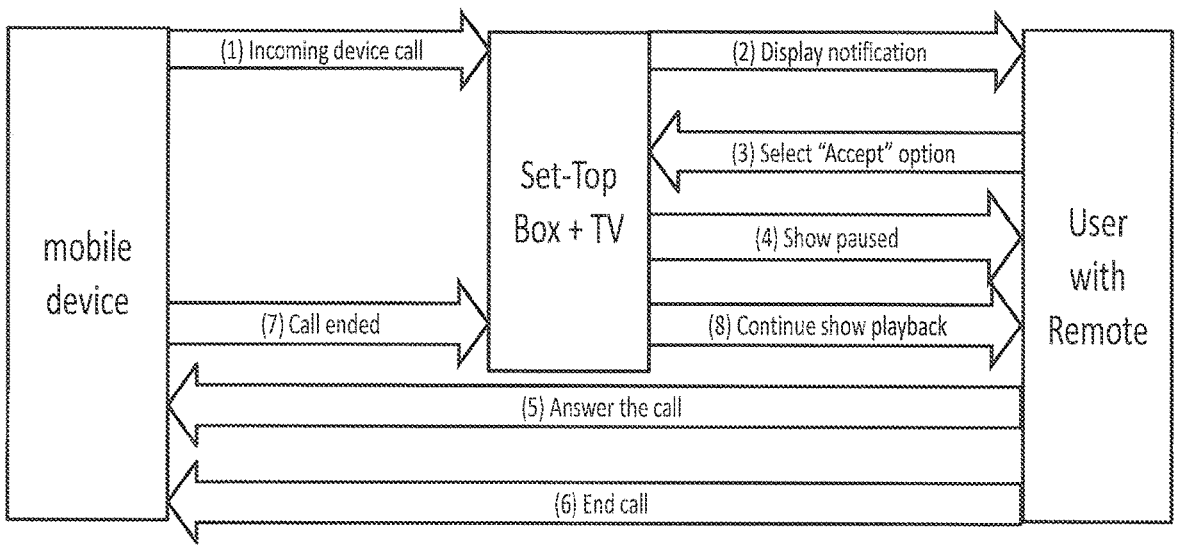
FIG. 15 is a block diagram illustrating one method of accepting incoming call application function according to the invention.

The diagram of FIG. 15 illustrates "accept incoming call 1" function of the invention. Mobile device receives an incoming device phone call. Telephony agent on the device sends notifications about an incoming call to the software agent on the set top box. Software agent on the set top box displays a notification to the user on the TV, the notification contains caller name and/or phone number and options including "Accept". User decides to accept the device call, selects "Accept" option on the screen using keys on the remote control unit. Software agent on the set top box pauses current show on TV. User picks up the mobile device and answers the call. User ends the call. Telephony agent on the device sends a notification about the call end to the software agent on the set top box. Telephony agent on the set top box removes notification from TV screen and continues video playback.

What may happen when receiving an incoming call, the incoming call notification is directed to set top box and the set up box agent displays the notification (similar to the one for prior application) and the user, for example, may select "accept" option. At that moment, the set top box agent (will) stops the show, so the user may have time to answer the call and not lose the content shown/displayed on TV. The content will be paused. Similarly, if there is an active dynamic application such as a game is active at the moment notification is received, that application will be put on hold. The user will pick up the call, speak to the caller on the phone, using regular capabilities. After call is ended, the agent on the mobile device sends the notification and the show automatically continues or dynamic application is un-paused.

Alternatively, when call is ended and software agent on mobile device sends notification that the call is ended, the software agent on the set top box can present the user with a message saying that during the call the video playback was paused and user has several options including option to continue the video playback from the moment the notification about phone call was received, option to continue video playback from the moment the user answered the call, and option to continue video playback from its current moment as currently being aired on the broadcast channel.

Alternative Use Function 4: Incoming Call 2

Figure 16:
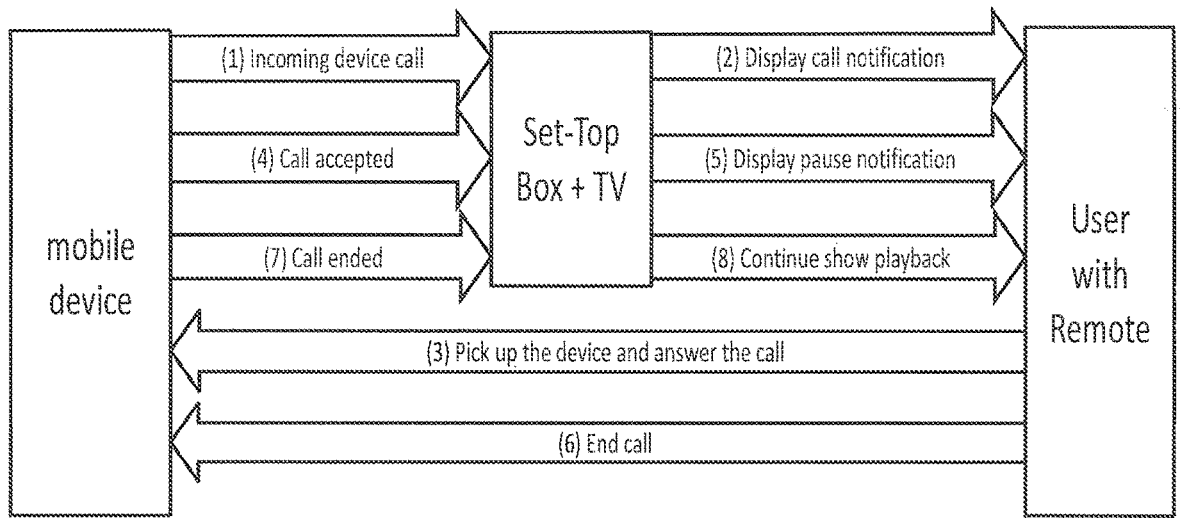
FIG. 16 is a block diagram illustrating another method of accepting incoming call according to the invention.

The diagram of FIG. 16 depicts "accept incoming call 2" function of the invention. Mobile device receives an incoming device call. Telephony agent on the device sends notifications about an incoming call to the software agent on the set top box. Set top box displays notifications to the user on the TV, the notification contains caller name and/or phone number. User picks up the mobile device and answers the call.

Telephony agent on the mobile device sends a notification to the software agent on the set top about answered call. Software agent on the set top box pauses current show and displays notification to the user about show being paused. User does not need to specifically put current video or dynamic application on hold, but can directly answer the call on the mobile device. At which point the software agent on the mobile device sends a notification to the software agent on the set top box about call being answered. When user ends the call, the software agent on the mobile device sends notification to the software agent on the set top box about call end. Software agent on the set top box hides notification and continues the show from where it was put on hold. Similarly, to previous application, the alternative is to not automatically continue the show playback, but display a message to the user on the TV screen with options to continue from the moment the call was received, the moment user picked up the phone, and from current moment being as being aired by the broadcast channel.

Both current and previous applications are about accepting incoming calls but the difference is how user acts to accept the call. In the application of FIG. 16 or 15, before picking up the phone and answering the call, the user uses a remote control unit to pause the current video, so the video they are watching is not continuing while they are on the call. The user will then have an option to continue the play back of the video from the point where it was paused. In the second application of FIG. 16, the user does not use remote control unit to pause the video and video playback continues. User goes to the phone, answers the call. From the moment the call is answered, the agent on the phone will get notice phone call is answered and in progress and will send a message to the set top box telling it the user has picked up the phone. This message will be used by the software agent on the set top box to automatically pause the video for user. When user ends the call, and returns to TV, they will be presented by a message on the TV screen saying the video was paused automatically and they have an option to either continue watching from where the video was automatically paused, or from an earlier moment when the incoming call was received, or from the current moment as being aired by the broadcast channel. This is the major difference from the first application, where user will pause the video himself using the remote control unit.

Use Function 5: Reply to Text Message

Figure 17:
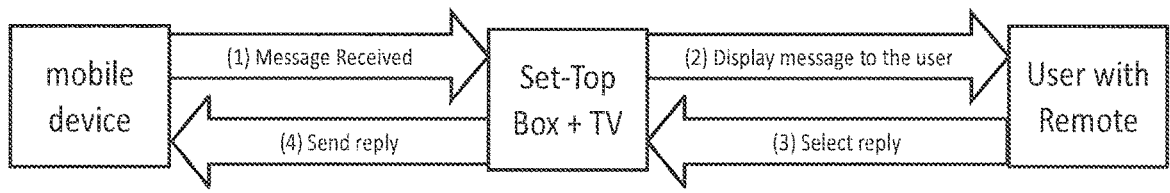
FIG. 17 is a block diagram illustrating replying to text message application function according to the invention.

The diagram of FIG. 17 depicts "reply to text message" function of the invention. Mobile device receives a text message. Messaging agent on the device forwards message to the software agent on the set top box. The message contains details about the message including sender name, phone number, time of receiving the message, and applicable actions such as delete, ignore, reply with pre-configured messages, etc.

Software agent on set top box displays the message and pre-configured replies on TV. User selects desired response message and presses "OK" on remote control unit. Software agent on the set top box forwards selection to the messaging agent on the mobile device. Messaging agent on the mobile device commands the device to send a reply to the other party. Device sends the text message with selected text back to the same device number the original message came from.

In the functionality of FIG. 17 a text is sent to the user phone. Message agent receives the notification and sends details to set top box agent with text detail (name and phone number, etc. whatever information is available on mobile device) and with possible actions such as ignore, delete, reply, etc.). Set top box displays the message on TV screen. The user selects desired message, i.e., I'm busy now and presses OK. Software agent on the set top box forwards the selection to the messaging agent on the mobile device. Messaging agent on the mobile device commands the device to sends a reply to the other party. Device sends the text message with selected text back to the same device number the original message came from.

Use Function 6: Save Advertiser to Phone Book

Figure 18:
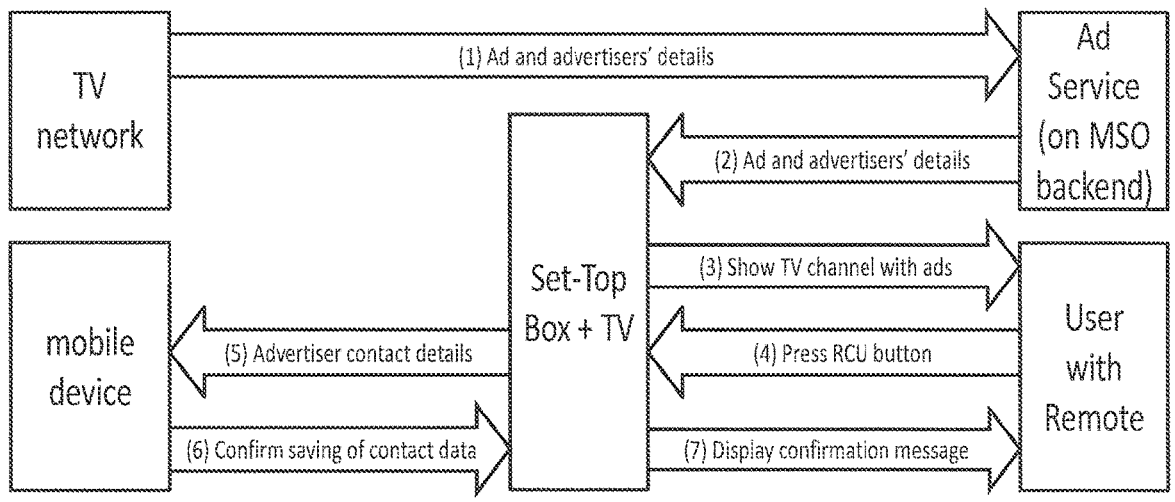
FIG. 18 is a block diagram illustrating saving advertiser to phone book function according to the invention.

The diagram of FIG. 18 depicts saving advertiser to a phone book function of the invention. Television networks (TV channel providers) supply Multiple Service Operators (MSO) with information on what advertisement will be shown on what time slot and on what channel. Server side advertisement service (Ad Service) collects information about advertisements including ad airing time, TV channel, advertiser name, advertiser phone number, advertiser email, advertiser address. Ad Service notifies set top boxes about collected information about advertisers as set forth in previous paragraph. User is watching TV and, when interested in currently aired ad, presses dedicated key on RCU to save advertiser's contact information. Software agent on STB sends message to mobile device with advertiser's contact details including name, email, telephone and address. Contacts software agent on mobile device saves advertiser's info into phone book or other application managing contacts on mobile phone. Contacts software sends confirmation about successful save operation to STB; Software agent on STB displays confirmation message to the user.

In the functionality of FIG. 18 there are two additional components present compare to the previously discussed diagram. These components are a TV network which is a source channeling videos for the user actually see it on TV. In addition to that, the TV network also provides the details on the planned advertisements that will be played during show. Specifically, the TV channel provider must specify the time, the specific channel, specific time the advertisement will be shown, and additional details such as the advertiser name, general description of the advertisement, advertiser's phone number, advertiser's address, advertiser's email address, advertiser's contact person name, advertiser's web site address, etc. All these details will be delivered to the MSO which is providing the end users with TV channel. All these details will be processed by the add service which is on the diagram on the top right. So, all these services will receive all these details, process it and deliver to the set top boxes, from that point, the set top box knows on which channel, and what time the advertisement will be shown and the set top box will also know what specific advertiser will be advertised and the details such as the name of the advertiser, telephone number and email address. When user uses the set top box and watches the TV there will be an advertisement displayed to the user. If user is interested of what is being advertised, has an option to use remote control unit to let the set top box know that he is interested with advertisement and wants to save it for future reference. He will use remote control unit to dedicate the remote control button for that. The software agent on set top box will receive the remote control button press and will find which specific advertisement the user is currently seeing based on the information previously provided to the set top box by the Ad service. This will allow software agent on the set top box to retrieve the details of the advertisement including name, telephone number, email address, etc. and send all details to the mobile phone. The software agent on the mobile device will receive this message with advertiser details and will create automatically for the user the entry in their phone book on their mobile phone. The user does not need to remember what was shown on TV, but only needs to press one button and all the advertiser details will be saved in the telephone book for later reference.

Example: A person wants to advertise on the TV. The person approaches TV network with specific request for advertisement, containing his company name, telephone number and email to be displayed. This information will be transferred to the set top box through an Ad service. When viewers are watching TV at specific time, they will see the advertisement. If a viewer is interested and wants these services, he will only need to press one button on the remote control unit. In this manner, the contact details will be automatically saved to the viewer's contacts/phone book.

Use Function 7: Alert on TV

Figure 19:
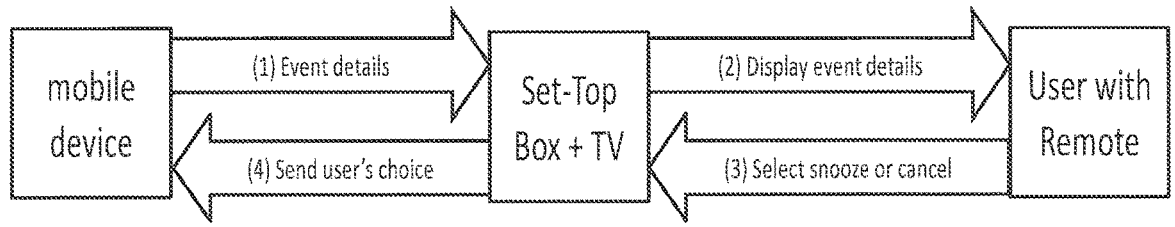
FIG. 19 is a block diagram illustrating alerts on TV function according to the invention.

The diagram of FIG. 19 depicts "alert on TV" functionality of the invention. Precondition: user has events with preconfigured alerts in their calendar application on mobile device. Alert on mobile device starts and calendar software agent on mobile device sends notification to STB with details about event for which alert has started. Software agent on STB displays message on TV with event details including title, start time, end time, repetition, invitees, and optional details including destination address, travel time, recommended time to leave, calendar name, calendar color, custom motes message. Along with event details, calendar software agent on the mobile device sends and software agent on the set top box displays several options for user to choose from including snooze or cancel. User selects desired option (snooze or cancel) using RCU. Software agent on the set top box sends selected option to mobile device. Calendar software agent on mobile device commands calendar application on mobile device to either snooze alarm or cancel it depending on user's choice as set forth in previous paragraph. Calendar application on mobile device executes command.

The functionality of FIG. 19 relates to the situation where the user creates an event in his mobile device calendar. This event in the calendar application consists of several details such as the title, the optional description, the physical geographical location if needed, or possibly a phone number to call. It will be also being presented with the start time and end time, and may also have other details that are used by the calendar application on the mobile device. First, the user watching the TV and the time for the event is for example 15 minutes prior to event, on their mobile phone there will be an alert that event is approaching. The software agent on the mobile device will get notification about the alert and will forward notification to the set top box. The software agent on the set top box will send a message with the old details of the event including the title, start/end time, location, invited, etc. including all other details that are known to the current application on the mobile phone. The software agent on the set top box will receive this message and will display message to the user on the TV with all the details and options to either cancel this alert, or request to repeat the alert in a few minutes. One of these two options will be received by the software agent on the set top box and the agent will send the message to the mobile phone with the user's choice. The software agent on the mobile phone will receive the message with the user's choice and will apply appropriate action which could be cancelling the alert or the alert will be snoozed and repeat in a few minutes again starting from the same notification.

Use Function 8: Low Power Notification

Figure 20:
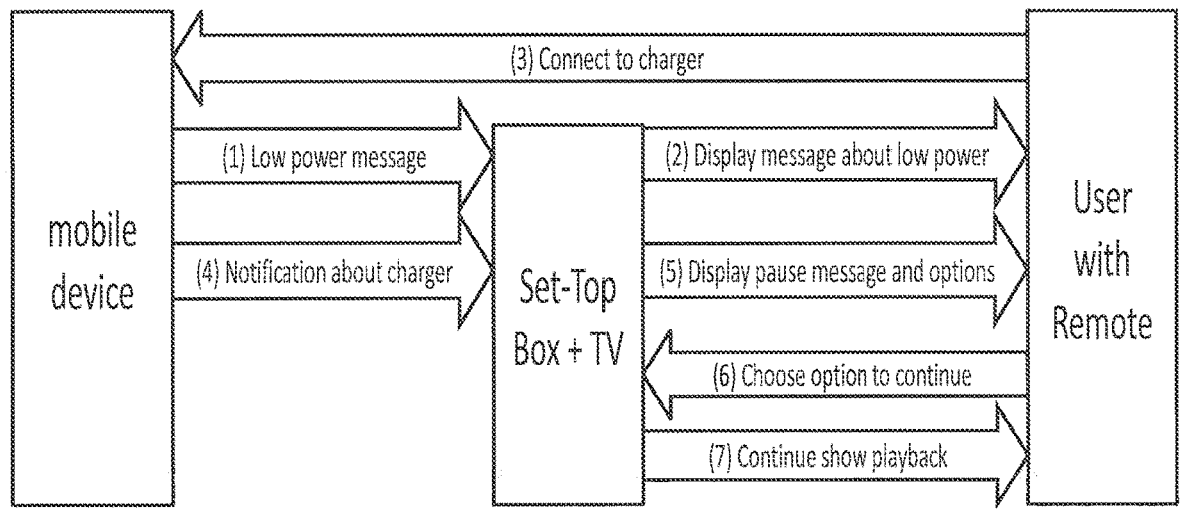
FIG. 20 is a block diagram illustrating low power notification function according to the invention.

The diagram of FIG. 20 depicts "low power notification" function of the invention. Power software agent on mobile device monitors power level on mobile device. Power level drop to low level. Power software agent sends message to STB with details about current power level on mobile device. Software agent on STB displays message to the user about low power level on mobile device and with option to pause current TV show or ignore this message. User can choose to (a) pause current TV show (while they will connect mobile device to charger), or (b) ignore message about low power level on mobile device, or (c) not to interact with STB at this moment and go directly to mobile device and connect it to charger. User ignores the options displayed on TV and goes to mobile device and connects it to charger. Power agent on mobile device detects connection to charger and sends message to STB about this event. Software agent on set top box pauses current TV show and displays on TV a message about TV show being automatically paused and with options to continue from the moment TV show was paused, or continue from the moment the message about low power was displayed, or from the current moment as being aired by the broadcast channel. User goes back to TV and using RCU selects the option to continue TV show playback from the moment the message about low power level was displayed. Power agent on STB rewinds TV show to the desired moment and continues TV show playback from there.

The functionality of FIG. 20 relates to letting the viewers know, while they are watching TV, that the phone is low on battery, so the viewer can pause the video they are watching and to connect the phone to the charger. After that the viewer can come back and continue watching TV from where it was left off. This application starts from the moment when the notification on the mobile device is received by the software agent on the mobile device regarding low power of the mobile device. The software agent on the mobile device will send the message to the set top box saying that the mobile device is low on power and will provide the power level such as for example, 10% or 20% depends on the settings on the mobile device. The software agent on the set top box will receive that message and display the message to the user on the TV saying that your mobile phone is low on power do you wish to pause the video and connect phone to charger. The user has two options, to either ignore this event or pause video and go to phone and connect it to the charger. There is another option to ignore. If user selects ignore option on the screen, the message will disappear from the TV screen and nothing else will happen from this point. User will simply continue watching the TV. If user selects another option, to pauses video, this will tell software agent on the set top box to pause the video and the user will go to phone, connect to the charger and after some time, return back to the TV and use remote to continue watching video from the moment where it was initially paused. The last option, the user does nothing with the remote control unit and does not tell anything to the set top box but user simply goes to the phone and connects it to the charger. The moment when the mobile device is connected to charger, a notification is created which will be retrieved by the software agent on the mobile device and a notification will be sent from mobile device to the set top box. Upon receiving notification, the set top box will automatically pause the current video and present the message on the TV screen for the user telling him that the video was automatically paused and present user with options to continue the playback from the moment when video was automatically paused or from the moment when the notification about low power was received. So, when the user returns to the TV, they will be able to continue watching the video from either point they choose.

Use Function 9—Save TV Screenshot

Figure 21:
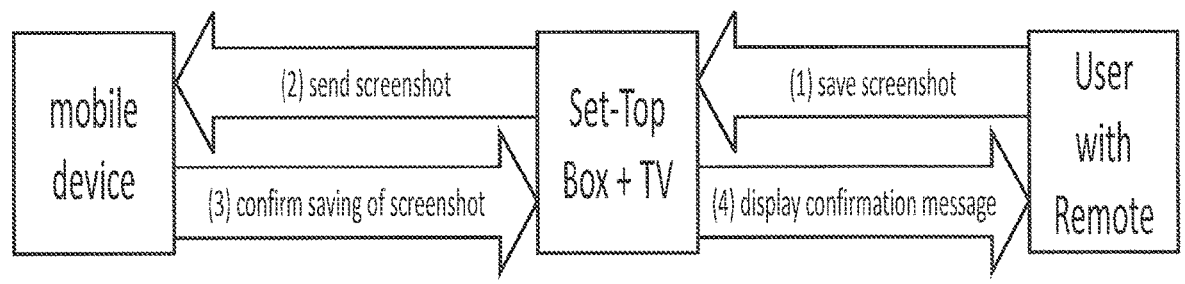
FIG. 21 is a block diagram illustrating saving TV screenshot function according to the invention.

The diagram of FIG. 21 depicts "save TV screenshot" function of the invention. User is watching TV and decides to save a screenshot of the current moment of the TV show they are watching. User presses RCU button to save screenshot. Software agent on STB verifies access rights to the current show and if screenshot is allowed to be taken, it takes the screenshot of the current show. Screenshot software agent on mobile device commands photo managing application on mobile device to save screenshot as yet another photo. Photo managing application saves photo and confirms success to screenshot software agent on mobile device. Screenshot software agent on mobile device sends confirmation message to STB.

Software agent on STB displays confirmation message on TV. User reviews and dismisses the message or message is automatically dismissed by software agent on set top box after timeout of user inactivity, if user is takes no actions with remote control unit.

The functionality of FIG. 21 allows the user to save the screenshot of the current video they are watching and send it to their mobile device. When user is watching TV, a viewer has an option to use remote control unit, so as to press a specific button which will be acknowledged by the software agent on the set top box. When the software agent and set top box receives the button press command, it will automatically verify if the current show is allowed to be screen shot at the current moment and allowed to be saved. It will check authorization for the user. If allowed, it will take screen shot from the current moment that is being displayed which will generate an image which will be then sent by the software agent on a set top box to the mobile device. The software agent on the mobile device will receive that image and will forward that image to the photo managing application on the mobile phone. The photo managing application will receive the image and save it as yet another photo and will confirm to software agent on the mobile device that the photo has been saved. The software agent on the mobile device will send a message to set top box saying the image has been saved and software agent on the set top box will receive that notification and will display a confirmation message to the user on the TV screen saying that the screen shot has been saved. The user will review the message and either dismiss it with remote control unit or ignore in which case the message will be automatically dismissed by software agent on set top box after a timeout of user inactivity.

Use Function 10: Pull Contact's Location

Figure 22:
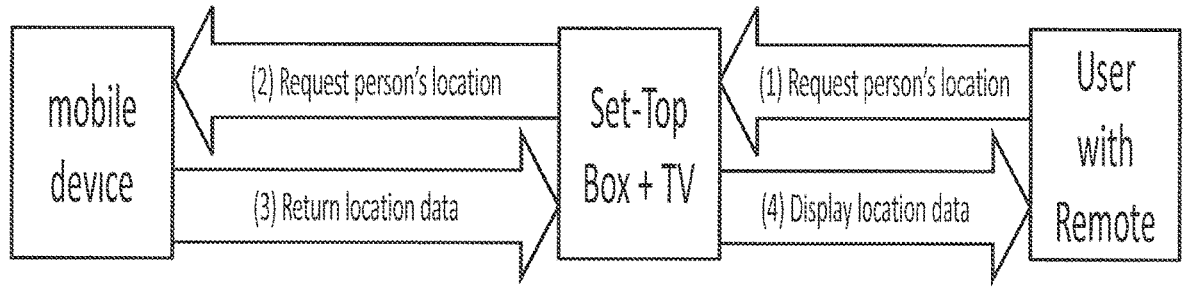
FIG. 22 is a block diagram illustrating pulling contact's location function according to the invention.

The diagram of FIG. 22 depicts "pull contact's location" function of the invention. User is watching TV and decides to check the location of the other person for which they have contact information stored on mobile device. User uses RCU to select the option to check location of the desired person. Location software agent on STB sends message to mobile device with request to provide location of the specific person. Location agent on mobile device retrieves location of the desired person from contacts service and location on mobile device. Location agent sends location details including longitude, latitude, city, state, location name, and map image to STB. Location agent on STB displays to a user a message on TV with said location details. User reviews the location details and uses the RCU to dismiss the message. The software agent on the set top box dismisses the message from the TV screen.

The functionality of FIG. 22 enables a user to obtain a geographical location of a specific place from the mobile device and displaying that location with the location map on a TV screen. So, for that the user uses the remote control unit to invoke the menu on the TV screen which has an option to check location of a specific person. The user goes to that menu item and selects it using the remote control unit. The software agent on the set top box will receive that choice and send request to the mobile device to receive the location of a specific person. The software agent on mobile device will communicate with the contact application on the mobile device and with the map application on the mobile device to retrieve the information about person's location. This map application will also present the image of the map where the person is and their specific location. This image will be forwarded by the software agent of the mobile device to the set top box. The software agent on the set top box will receive that image and display it on the screen and the user will basically see where the person of interest is physically.

Use Function 11: Geographical Location Notification

Figure 23:
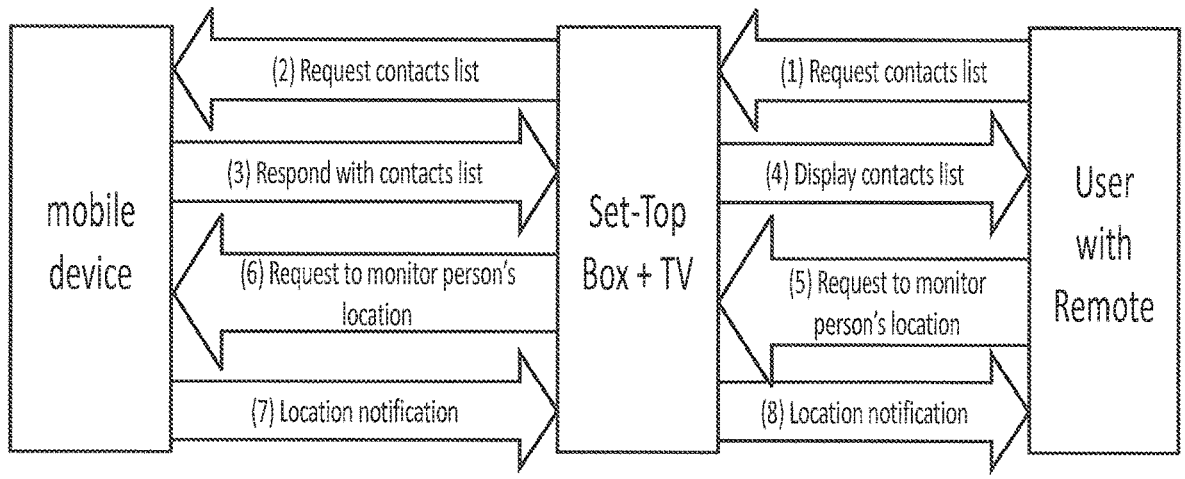
FIG. 23 is a block diagram illustrating geographical location notification function according to the invention.

The diagram of FIG. 23 depicts "geographical location notification" function of the invention. User is watching TV and decides to monitor geographical location of one of their contacts. User uses RCU to select the option to retrieve a list of contacts from mobile device. Software agent on set-top box sends a command to mobile device to retrieve list of contacts. Contacts software agent on mobile device retrieves list of contacts and sends said list back to software agent on STB. Software agent on STB displays list of contacts to the user. User uses RCU to select a person from the contacts list and selects an option to receive notification when selected person enters a specific geographical location; the geographical location can be, for example, 2 miles from user's current geographical location. Location software agent on STB sends message to mobile device with request to send notification to STB when selected contacts enter selected geographical location. Location software agent on mobile device monitors location of the selected contact by using contacts service on the mobile device. Location application on the mobile device detects selected person entering specified location and notifies location software agent on the mobile device. Location software agent sends location details including longitude, latitude, city, state, location name, and map image to STB. Location software agent on STB displays to the user a message on TV with the location details.

The functionality of FIG. 23 is about being notified when a person of interest is entering a specific geographic location. For example, a parent may be interested on monitoring their kids return from school on time. As a first step, the user, e.g. parent, requests a list of contacts stored in phone. Then user selects specific person there are interested in, specify a location such as current home address and a radius, e.g. 1 mile, with center in the specified location. The software agent on STB communicates user's selection to the mobile device. The software agent on STB communicates with relevant services on the mobile devices such as contacts, maps, navigation, etc. to set a notification each time a person of interest enters said location with said radius.

Use Function 12: Estimated Time of Arrival Location

Figure 24:
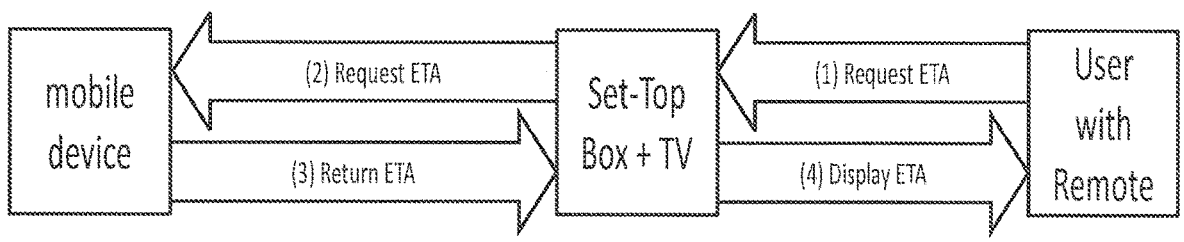
FIG. 24 is a block diagram illustrating estimated time of arrival function according to the invention.

The diagram of FIG. 24 depicts "Estimated time of arrival" function of the invention. User is watching TV and wants to know the estimated time of arrival to one of their favorite geographical locations. User uses RCU to select the option to check the estimated time of arrival to the specific geographical location. Location software agent on STB sends message to mobile device with request to provide an estimated time of arrival to specific geographical location. Location software agent on mobile device retrieves estimated time of arrival to specific geographical location from the location service on mobile device. Location software agent sends estimated time of arrival to STB. Location software agent on STB displays to the estimated time of arrival.

The functionality of FIG. 24 enables a user to find an estimated time of arrival to the specific geographic location (or destination). For this a user has an option to select a destination of interest and requests to find an estimated time of arrival. The agent on STB sends said request to the mobile device. The corresponding agent on the mobile device uses relevant service on the mobile devices such as navigation service or map service or another service as applicable to retrieve estimated time of arrival to said destination and sends said time of arrival to STB for presentation to the user.

Use Function 13: Set Reminder for TV Program

Figure 25:
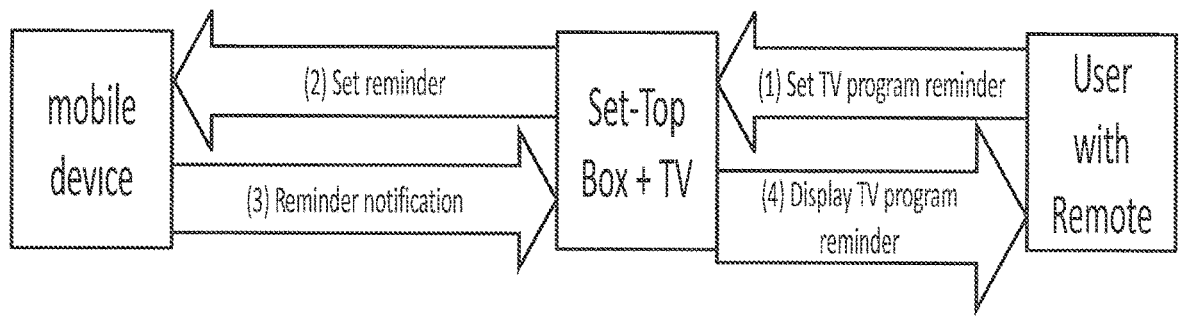
FIG. 25 is a block diagram illustrating setting reminder for TV program function according to the invention.

The diagram of FIG. 25 depicts "Set reminder for TV program" function of the invention. User is watching TV and sets reminder for specific TV program; User uses RCU to select the option to set reminder. Calendar software agent on STB sends message to mobile device with request to set a reminder for specific time and provide reminder's title that includes a reference to the selected TV program; a reference can consist of, for example, a program title, series season number, series episode number. Calendar software agent on mobile device creates reminder with contacts service on mobile device. When reminder's time comes, the calendar service on mobile device notifies calendar software agent. Calendar software agent sends notification about reminder to STB and includes reminder's details such as title. Calendar software agent on STB displays to the reminder to the user; the displayed reminder includes previously constructed reminder title that includes details about TV program.

The functionality of FIG. 25 enables a user to set a reminder or (ON ??) mobile device for the TV program in the future that user is interested in. For example, it can be (a) a movie scheduled to be aired in the future, (b) Pay-Per-View (PPV) event the user has paid for, (c) next episode of the series the user is interested in, (d) a Video-On-Demand (VOD) movie the user has purchased and wants to watch at a specific time no later than expiration of VOD lease time. For this a command is being sent to mobile device so that software agent on mobile device can use calendar service on mobile device to set a reminder. When reminder's time comes, a user will be notified on both their mobile device and on TV so that they have a better chance to receive a notification about approaching time to watch whether they are currently watching TV and don't have a mobile device in their vicinity, or vice versa, they have a mobile device in their vicinity and not watching TV.

Use Function 14: Pay with Cable Bill

Figure 26:
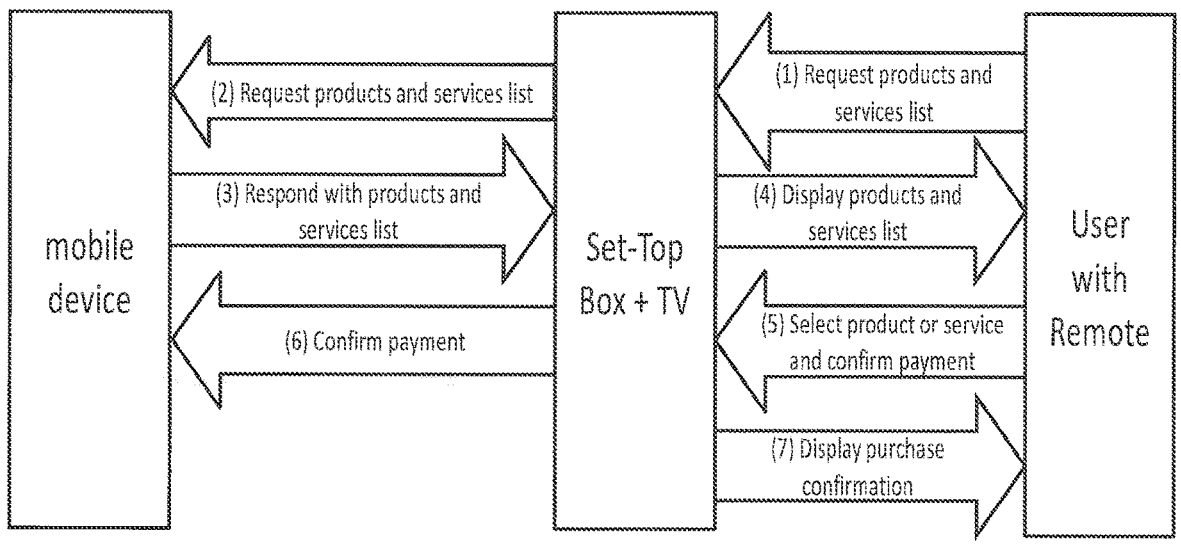
FIG. 26 is a block diagram illustrating paying with cable bill function according to the invention.

The diagram of FIG. 26 depicts "Pay with cable bill" function of the invention. User is watching TV and decides to buy a product or service that is offered by one of software application on the mobile device; User uses RCU to get list of products and service available. Purchasing software agent on STB sends message to mobile device with request to retrieve a list of products and services available for sale. Purchasing software agent on mobile device retrieves a list of services and products from a relevant application on the mobile and send this list back to STB. Purchasing software agent on STB displays a list of services and products to the user. User selects a product or service they want to buy, then selects cable bill as payment method, and confirms purchase action by entering a purchasing PIN code. Purchasing software agent on STB contacts billing service on STB to make a payment for the amount needed. Billing service on STB verifies that user has enough credit, charges user's cable account for the requested amount of money, and confirms successful payment to purchasing software agent on STB. Purchasing software agent on STB displays a confirmation message to the user and sends payment confirmation to the mobile device. Purchasing software agent on the mobile device confirms successful payment to a software application on mobile device that provided list of products and service. The application on mobile device sends a notification to the product seller or service provider so that seller or provider can arrange for delivery of the product or service.

The FIG. 26 discloses the functionality of the invention related to payment for a product or service offered to the user through user's mobile device. The user's cable bill is used in this case as a payment method. This implies that cable service provider allows user to charge user's account with said cable service provider to pay for third party services and products. This also implies that said cable service provider can send required finds to the product seller or service provider the user is paying for. In this function user requests products and services list from mobile device, selects a product or service, selects an option to purchase it, and confirms purchase by entering a purchasing PIN (personal identification number). Upon successfully entering a PIN number, the user's account with cable service provider is charged for the required amount and if charge is successful, the payment notification is sent to the product seller or service provider so that they can arrange for delivery.

Use Function 15: Pay with Mobile Device

Figure 27:
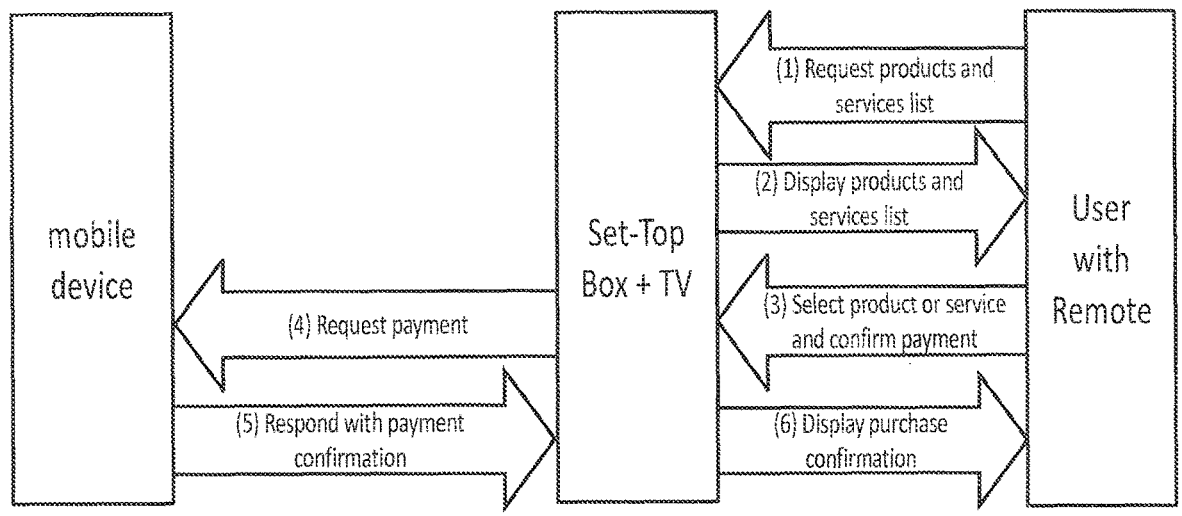
FIG. 27 is a block diagram illustrating paying with mobile function according to the invention.

The diagram of FIG. 27 depicts "Pay with mobile device" function of the invention. User is watching TV and decides to buy a product or service that is offered by one of selling software application on the STB. User uses RCU to get list of products and service available. Purchasing software agent on STB retrieves a list of products and services from selling application. Purchasing software agent on STB displays a list of services and products to the user. User selects a product or service they want to buy, then selects mobile payment as payment method, and confirms purchase action by entering a purchasing PIN code. Purchasing software agent on STB sends payment request to a mobile device to make a payment for the amount needed. Purchasing software agent on STB contacts payment service on the mobile device to make a payment. Payment service on mobile device charges relevant user account with a bank and confirms successful charge to a purchasing software agent on the mobile device. Purchasing software agent on the mobile device sends a response to STB with payment confirmation. Purchasing software agent on STB displays receives payment confirmation and displays a purchase confirmation message to the user. Purchasing software agent on STB notifies a selling software application on STB about successful payment. The selling application on STB sends a notification to the product seller or service provider so that seller or provider can arrange for delivery of the product or service.

The functionality of FIG. 27 is similar to the previously discussed functionality. The difference in this case is that (a) the services or products the user is paying for are offered through selling software applications on the STB and (b) the charge is applied to the payment methods available on mobile device.

Use Function 16: Confirm Payment

Figure 28:
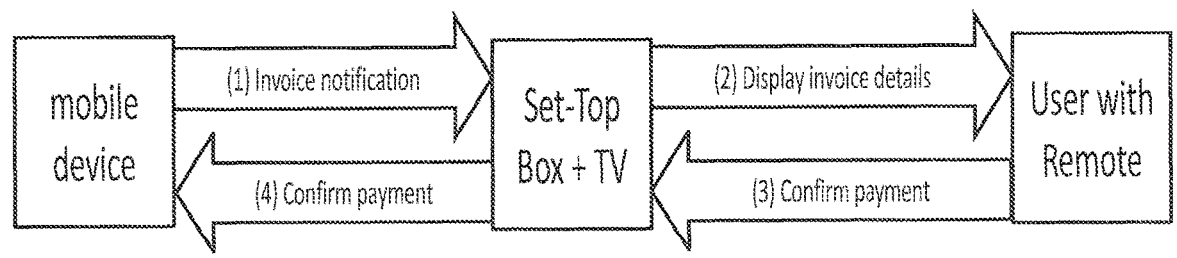
FIG. 28 is a block diagram illustrating confirming payment application according to the invention.

The diagram of FIG. 28 depicts "Confirm payment" function of the invention. Precondition: user has previously made an order for product or service and opted for the invoice to be sent to their email address or to a relevant software application on user's mobile device. A seller of the product or provider of the service that user ordered sends an invoice to user's email or supporting application on user's mobile device. Purchasing software agent on STB monitors user's email for invoices and/or subscribes for invoice notification from supporting software application on mobile device. Purchasing software agent on STB receives an email with invoice or receives invoice notification from supporting software application on mobile device. Purchasing software agent on STB sends an invoice notification to STB. Purchasing software agent on STB displays a message to the user with invoice details. User uses remote control unit to confirm payment and enters purchasing PIN to complete confirmation process. Purchasing software agent on STB sends payment confirmation to the mobile device. Purchasing software agent on the mobile device receives payment confirmation and sends a notification or email with payment confirmation to the service provider or product seller so they can arrange for user account charging on their end for delivery of the product or service.

The diagram of FIG. 28 discloses the functionality of the invention related to the capability to confirm payment for specific service or product upon receiving an invoice. The invoice is received by the relevant software application on the mobile device. The payment is confirmed by the user on the STB when notification about invoice is displayed on user's TV.

Use Function 17: Search for Context Specific Information

Figure 29:
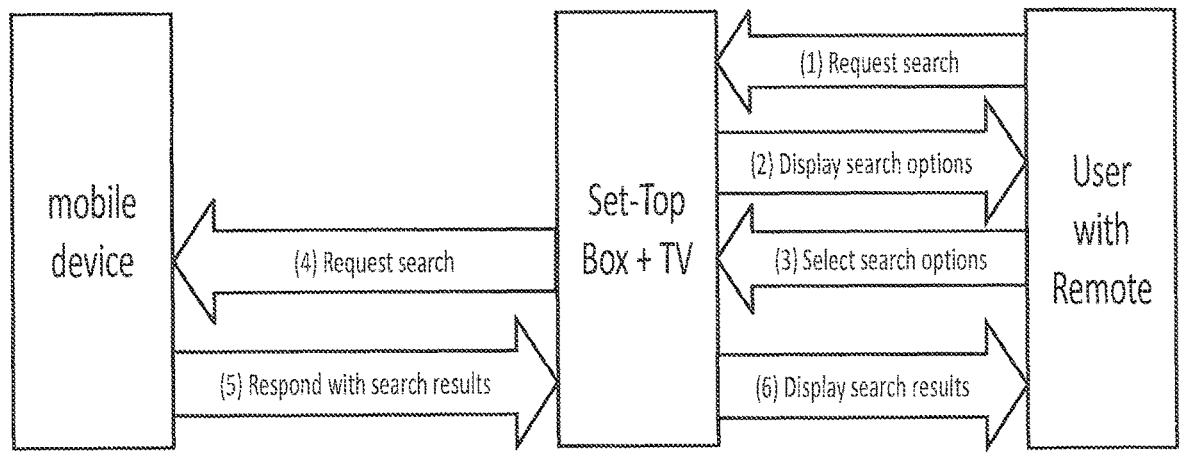
FIG. 29 is a block diagram illustrating searching for context specific information function according to the invention.

The diagram of FIG. 29 depicts "Search for context specific information" function of the invention. User is watching TV and decides to find more information about a program or actor or other information related to the program they are watching. User uses RCU to select the option to search for more information. Search software agent on STB displays a message to the user with options available to select search area such as actors, program title, crew, products or geographical locations or another context shown in a current program or in a current scene of the program. User uses RCU to select search options and to confirm selection. Search software agent on STB sends search request to mobile device with all search options selected by user. Search software agent on mobile device relays search request to a relevant search service on the mobile device. Search service on mobile device performs search and returns search results to the search software agent on mobile device. Search software agent on mobile device responds to STB with search results. Search software agent on STB receives search results and displays a message to the user with said search results.

The diagram of FIG. 29 discloses the functionality of the invention related to utilization of a mobile device to verify information about people, movies, shows, and other content that user is seeing while watching a movie or other program. The software agent on STB uses so-called EPG data (electronic program guide data) available on STB and used to present such typical STB software application like Guide, VOD portal, Search application, etc. The EPG data contains relevant data about each program being aired and typically includes program title, cast, crew, rating, series, episodes, etc. This information, in this application, is used to form a search request to mobile device. The user has an option to specify which data they want to use to form a search request. The software agent on mobile device uses mobile device's search capabilities to find requested information and passes it to STB where search results are displayed to the user.

Use Function 18: Tag Video Content and Publish Tag to Social Network

Figure 30:
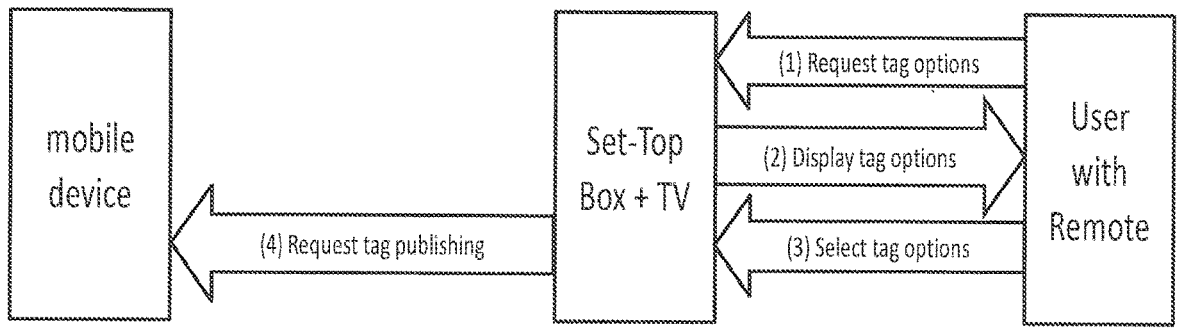
FIG. 30 is a block diagram illustrating tagging video content and publishing tag to social networks function according to the invention.

The diagram of FIG. 30 depicts "Tag video content and publish tag to social network" function of the invention. User is watching TV and decides to add tags to the video content they are watching and share the tag on social network such as Facebook, Twitter, Google+, etc. User uses RCU to request options for tagging. Social software agent on STB displays a message to the user with tag options available such as "like", "dislike", "favorite", other similar options and allows user to create own custom tag; selection of social networks to publish tags to is also available. User uses RCU to select tags they want and possible creates custom tags and also selects social network they want to publish tags to. Social software agent on STB sends tag publishing request to mobile device with all selected tags, selected social networks, and information about program that user selected or created tags for. Social software agent on mobile device converts received tags and program information into a format suitable for publishing to selected social networks and sends publishing request to the social software service on mobile device.

The diagram of FIG. 30 discloses the functionality of the invention related to an option available to the user to tag a program they are currently watching on TV with predefined tags such "Like" and "Dislike" and with custom tags that user can enter while watching TV. The user also selects social network they would like their tags to be published to. By publishing the relevant method for the given social network will be used. For example, for Facebook it can be a new post on user's page while on Twitter it will be a new tweet.

Figure 31:
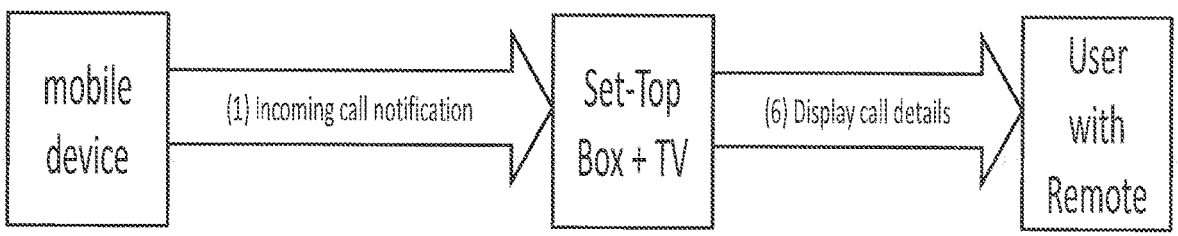
FIG. 31 is a block diagram illustrating incoming call notification with geographical location of the caller function according to the invention.

Use Function 19: Incoming Call Notification with Geographical Location of the Caller The diagram of FIG. 31 depicts "Incoming call notification with geographical location of the caller" function of the invention. Prerequisite: the user has previously selected to receive notification on STB about incoming calls on mobile device; the user has also selected to include geographical location of the caller, if that information is available. Caller ID software agent on mobile device subscribes with telephony service on mobile device to receive notifications about incoming calls. Telephony service on mobile device sends incoming call notifications to caller ID software agent on mobile device. Caller ID software agent on mobile device uses geographical location service on mobile device to retrieve geographical location of the caller by phone number. Caller ID software agent on mobile device also checks with contacts service on mobile device if caller is in user's contact list and caller has location sharing enabled for the user. If this is so, then caller ID software agent on mobile device retrieves caller's geographical location from contacts application that in turn gets geographical location from caller's mobile device. Caller ID software agent on user's mobile device send incoming call notification to STB. Caller ID software agent on STB displays a message to the user with information about incoming call and geographical location of the caller.

The diagram of FIG. 31 discloses the functionality of the invention which displays a notification to the user about incoming calls to user's mobile device while user is watching program on TV. This is pretty much the same functionality as with the regular Caller ID notifications known to the TV industry. However, the principal differences are that (a) caller ID notification is received from the mobile phone instead of a designated back-end controlled by cable service provider, and (b) the notification is enhanced with extra data that is not available in the conventional method of caller id notification.

The advantage of the caller ID notifications being sent from user's mobile device is that the user does not need to be subscriber of the telephone or mobile service with cable service provider, but can have a contract for mobile service with any other provider of the mobile service.

Another advantage of the caller ID notifications being sent from user's mobile device is enhancement of the said notifications with extra data such as, for example, geographical location of the caller, caller's company or caller's family relations to the user as stored in the contacts application on mobile device, verification of the caller's number against known spammers and scammers, and many more. Any service or information that can be found using user's mobile device and which is relevant to the caller, can be used to enhance the caller ID notification.

Use Function 20: View Geographical Locations of the Contacts

Figure 32:
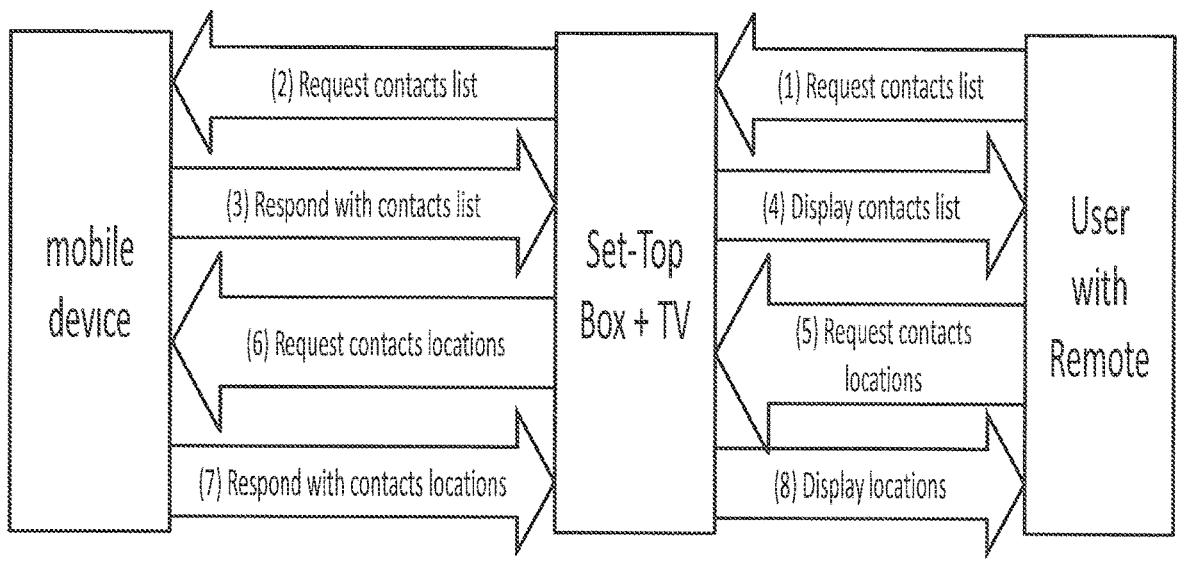
FIG. 32 is a block diagram illustrating viewing geographical locations of the contacts function according to the invention.

The diagram of FIG. 32 depicts "View geographical locations of the contacts" function of the invention. Precondition: some of user's contacts on mobile device agreed to share their geographical location with the user. User watches TV and decides to check current geographical locations of some of their contacts. User uses RCU to request a contact list. Contacts software agent on set-top box sends a command to mobile device to retrieve list of contacts. Contacts software agent on mobile device retrieves list of contacts from contacts service on mobile device and sends said list back to software agent on STB. Software agent on STB displays list of contacts to the user. User uses RCU to select a person from the contacts list and selects option to check geographical location of selected persons. Contacts software agent on STB sends request for geographical location to mobile device. Contacts software agent on mobile device retrieves geographical location of the selected contacts by using contacts service on the mobile device and sends retrieved information to STB. Contacts software agent on STB receives information about geographical location of the selected persons and displays it to the user.

The diagram of FIG. 32 discloses the functionality of the invention related to seeing current geographical location of some of the user's persons. For this, the contacts list is requested from STB and user selects which users they wish current geographical location to know. When contacts are selected, the request is forwarded to the mobile device where relevant software service such as contacts can find said geographical location and send it back to STB for displaying on TV. This function implies that said persons allowed their geographical location to be shared with the user. For example, this can be the case for family members or friends that are gathering for a party.

Use Function 21: Recommended Content on TV Based on Mobile Browsing History

Figure 33:
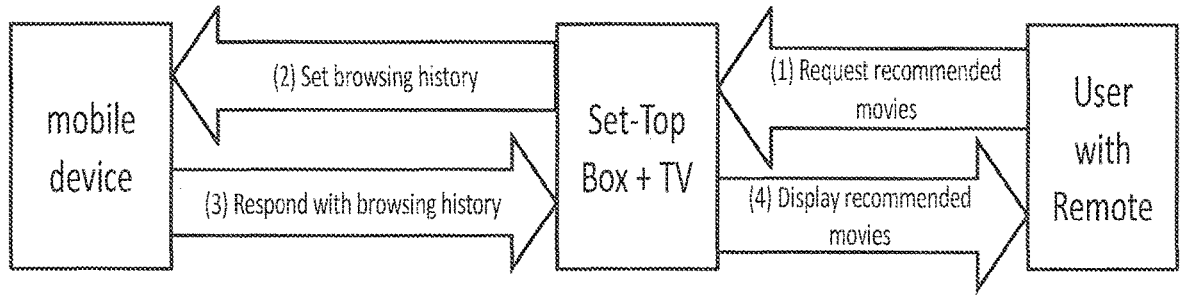
FIG. 33 is a block diagram illustrating recommended content on TV based on mobile browsing history function according to the invention.

The diagram of FIG. 33 depicts "Recommended content on TV based on mobile browsing history" function of the invention. User is watching TV and uses RCU to invoke a recommendation service on STB that helps user to find movies relevant to user's interests. Recommendation service on STB sends a request to the recommendation software agent on STB to retrieve users browsing history on mobile device. Recommendation software agent on STB sends message to mobile device with request to retrieve users browsing history on mobile device. Recommendation software agent on mobile device retrieves user's browsing history from the web browser on the mobile device and sends browsing history back to STB. Recommendation software agent on STB receives browsing history and responds to the recommendation service on STB with said browsing history. Recommendation service on STB sends browsing history to recommendation backend controlled by cable service provider. Recommendation backend uses browsing history and user's watching history to find movies that user may be interested in and responds to STB with list of recommended movies. Recommendation service on STB displays list of recommended movies to the user.

The diagram of FIG. 33 discloses the functionality of the invention related to enhancing so-called recommendations with user's interest as tracked in their web browser on the mobile device. The recommendation is a term used in TV industry to refer to the movies, series and other relevant video content that user may be interested in and can opt up to pay for, if said recommended content is offered as premium content. Typically, the recommendation service uses only user's history of the video content consumption within services provided by the cable service provider for services of which the user has subscribed to. The advantage of the approach disclosed in FIG. 33 is that recommendation service can provide better recommendations based on user's interest that is tracked in the web browser on user's mobile device. For that user's browsing history is fetched from user's mobile device and is sent to the recommendation service when requesting recommended video content.

Use Function 22: Auction Bidding

Figure 34:
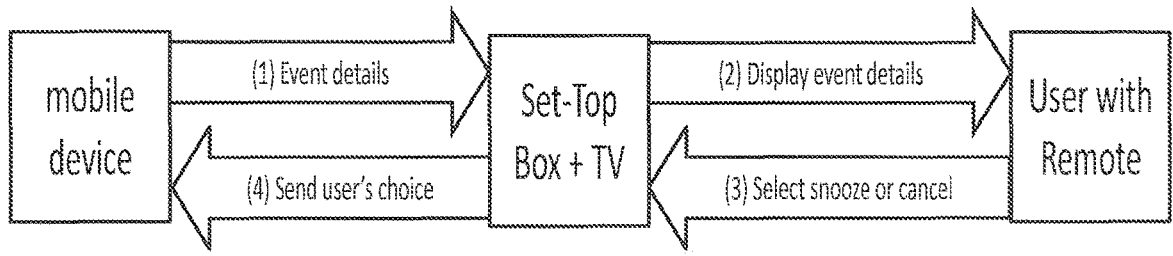
FIG. 34 is a block diagram illustrating auction bidding function according to the invention.

The diagram of FIG. 34 depicts "auction bidding" function of the invention. Precondition: user has started bidding using bidding application on mobile device such as eBay or other bidding application. Bidding application on mobile device monitors bids from other bidders and notifies the bidding software agent on mobile device when user's bid has been outbid. Bidding software agent on mobile device sends notification to STB. Bidding software agent on STB displays message to the user with current bid and asks user for the desired action such as increase bid or stop bidding or wait for desired time. Users uses RCU to select desired action. Bidding software agent on STB sends a message with selected action to mobile device. Bidding software agent on mobile device receives said message and sends relevant command to the bidding application on mobile device.

The diagram of FIG. 34 discloses the functionality of the invention related to the controlling the auction bidding process from TV. The context of this application is user had previously initiated a bidding for desired product using auction bidding software application on user's mobile device. The auction may be a very lengthy process of several days and weeks such as typically with auctions in eBay or similar services. During such a prolonged period, the user may be consuming video content on TV several times. This is that time when the approach disclosed in FIG. 34 is used.

The bidding software application on the mobile device monitors the bidding process for user and notifies software agent on mobile device about important events such as outbid, cancellation, etc. The notification about such events are presented to the user on TV from where the user has an option to react accordingly, for example, by increasing the bid, and then continue watching TV.

Use Function 23: Time to Leave Notification

Figure 35:
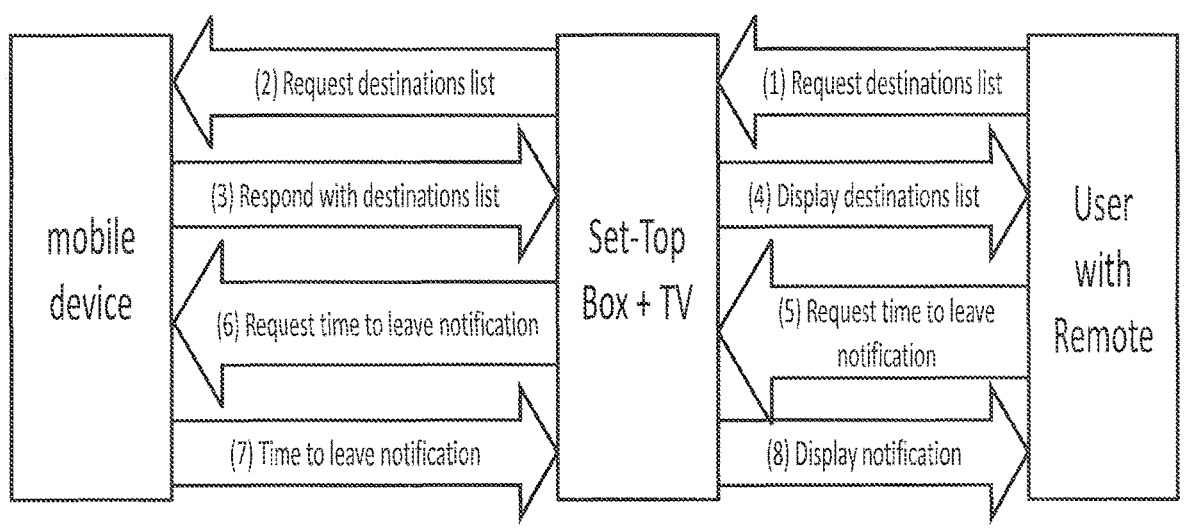
FIG. 35 is a block diagram illustrating time to leave notification function according to the invention.

The diagram of FIG. 35 depicts "time to leave notification" function of the invention. User watches TV and decides to check estimated time to leave to reach specific location they want to go in the near future. User uses RCU to request a list of destinations they have recently searched for or navigated to using navigation software service on their mobile device. Navigation software agent on set-top box sends a command to mobile device to retrieve list of recent and favorite destinations. Navigation software agent on mobile device retrieves list of destinations from navigation service on mobile device and sends said list back to STB. Navigation software agent on STB displays list of destinations to the user. User uses RCU to select a destination, specifies a desired time they want to be in that destination, selects option to be notified when it is time leave to get to said destination at selected time, and selects a time frame they want to be notified prior to recommended time to leave. Navigation software agent on STB sends request with said parameters to mobile device. Navigation software agent on mobile device communicates with navigation service on mobile device to retrieve recommended time to leave to reach desired destination. Navigation software agent on mobile device sets an alarm on mobile phone to the time before time to leave as requested by user and a second alarm at time to leave. When either of alarms fires on mobile device, navigation service on mobile device sends notification about approaching time to leave to STB. Navigation software agent on STB displays a message about destination and time to leave.

The diagram of FIG. 35 discloses the functionality of the invention which provides a user with the ability of accessing to the so-called "time to leave" feature of the modern navigation services such as Google Maps and others. This feature allows user to estimate the time when user needs to leave their current location to get to the desired destination no later than desired time. The functionality disclosed in FIG. 35 allows user to select a desired destination and desired arrival time. This data is then used to query the navigation software application on the mobile device to estimate the time to leave user's current location. The current location in this case is assumed the address at which the STB is registered.

What is claimed is:

1. A system for controlling at least one unmanaged device via a TV controller, the system comprising:
   a) said TV controller having a first software agent application thereon, said software agent application adapted to send a first registration message;
   b) said at least one unmanaged device having a second software agent application installed thereon, said second software agent application including a circuit breaker module for protecting said at least one unmanaged device in case of failure of execution of a command, said second software agent is adapted to send a second registration message;
   c) a partner device discovery module adapted to pair said TV controller and said at least one unmanaged device;
   d) an address mapping module, mapping static IDs and dynamic addresses of at least one of said controller and said at least one unmanaged device, said address mapping module including at least one record, said at least one record including a pair of a dynamic address and a static identifier of at least one of said TV controller and said at least one unmanaged device;
   e) at least one service registry on installed on at least one of said TV controller and said at least one unmanaged devices, adapted for discovery of at least one software agent; and
   f) an intermediary messaging server, for communication between said TV controller and said at least one unmanaged device, said intermediate messaging server including:
      i. an API gateway module adapted to provide abstracted access to functions of said at least one unmanaged device;
      ii. a partner device router adapted to maintain many-to-many relationships between TV controllers and unmanaged devices,
      iii. a transport manager module adapted to manage transport protocols available for communication between said TV controller and said at least one unmanaged device and to translate messages between said transport; and
      iv. a template directory including a message template directory adapted to manage message templates and an application templates generator.

2. The system of claim 1, wherein:
   said first and second software agents are in direct communication with one another;
   said first software agent is adapted to receive said second registration message and said second software agent is adapted to receive said first registration message, thereby to pair said first and second software agents; and
   said first software agent is adapted to maintain a first list of services available on said at least one unmanaged device and said second software agent is adapted to maintain a second list of services available on said TV controller.

3. The system of claim 1, wherein:
said first and second software agents are not in direct communication with one another;
said intermediary messaging server is adapted to receive said first and second registration messages, thereby to pair said first and second software agents via said intermediary messaging server; and
said intermediary messaging server is adapted to maintain a first list of services available on said at least one unmanaged device and a second list of services available on said TV controller.

4. The system of claim 1, wherein said second software agent is adapted to:
listen for pre-defined events and to monitor conditions on said at least one unmanaged device;
upon detection of a monitored condition being met, convert said monitored condition into a condition event;
upon identification of a pre-defined event or creation of said condition event, generate a message corresponding to said pre-defined event or to said condition event using a specific message template provided by said template directory; and
send a notification, including said message, to said TV controller.

5. The system of claim 3, wherein, when said first and second software agents are in indirect communication:
said second software agent is adapted to send said notification, including said message, to said intermediary messaging server; and
said intermediary messaging server is adapted to:
perform message transformation and protocol translation so that said notification including said message will be suitable for delivery to said TV controller using a transport protocol available to said TV controller, wherein said intermediate messaging server is adapted to perform said message transformation using at least one message template provided by said template directory, and to perform said transport protocol translation using said transport manager module; and
deliver said notification including said message to said TV controller, following said message transformation, using said transport protocol available to said TV controller.

6. The system of claim 5, wherein:
said first software agent is adapted, upon receipt of said notification including said message, to render a visual presentation of said message using presentation details provided in said message and defined by said specific message template, and to display said visual presentation on a screen associated with said TV controller, and is further adapted, following said displaying of said visual presentation on said screen, to:
a. receive an input from a user in the form of a selected action button;
b. translate said selected action button into a command for execution by said unmanaged device;
c. generate a command message including said command using a second specific message template provided by said template directory; and
d. send said command message to said unmanaged device; and
said second software agent is adapted to:
a. receive said command message;
b. translate said received command message into one or more executable commands; and
c. execute said executable commands.

7. The system of claim 6, wherein said circuit breaker module is adapted to carry out the following steps during execution of said executable commands:
monitor execution of said executable commands on said unmanaged device for unusual behavior; and
upon detection of unusual behavior, terminate execution of said command on said unmanaged device and attempt to return said unmanaged device to a state corresponding to a state of said unmanaged device prior to the attempt to execute said executable commands.

8. The system of claim 1, wherein each said message template in said template directory defines, for a corresponding message, a message format and message content, including required message fields, data format, and a layout for presentation of said corresponding message on a screen, said layout including a definition of a visual appearance of said corresponding message, on-screen action buttons, and identifiers of actions.

9. The system of claim 1, wherein
said TV controller comprises a set-top box;
said first software agent comprises an application provided and installed on said set-top box;
said unmanaged device comprises a smart phone;
said second software agent comprises an application installed onto said smart phone;
said intermediary messaging server comprises an AMS server, including:
an address mapper forming part of said AMS server implementing said address mapping module;
a first application adapter implementing said partner discovering module;
a second application adapter implementing said partner device router module;
a third application adapter implementing said service registry functionally associated with a data storage adapter for storing registries in an associated database;
a transport manager of said AMS implementing said transport manager and adapted to support necessary transport actions, transport translation, and message transformation; and
a fourth application adapter implementing said template directory, functionally associated with said data storage adapter for storing said message templates in said associated database.

10. The system of claim 1, wherein said first and second software agents are in direct communication with one another, and said TV controller and said unmanaged device each include a module for performing message transformation.

11. The system of claim 1, wherein said address mapping module is adapted to maintain, for said TV controller and for each of said at least one unmanaged device, an up-to-date record of a pair of a dynamically changing address and a corresponding static identifier, and prior to sending a communication from a sending device to a receiving device, said address mapping module is adapted to translate a static address of said receiving device into a corresponding dynamically changing address of said receiving device for delivery of said communication by said transport manager.

12. The system of claim 1, wherein said application template generator is adapted, upon said sending a notification or sending a command message, to:
generate at least one mini-application for execution on at least one of said TV controller and said unmanaged device, said mini-application including at least one widget for display on a screen associated with at least one of said TV controller and said unmanaged device, said widget, when presented to a user, provides a definition of a received message as well as a set of on-screen buttons for user selection of a desired command or action;

generate instructions for at least one of said TV controller and said unmanaged device to silently perform an action on behalf of the user without interrupting a viewing experience of the user;

extend a functionality of said TV controller using functionalities of said unmanaged device; and extend a functionality of said unmanaged device using functionalities of said TV controller.

13. The system of claim 1, wherein said partner device router and said API gateway are adapted to at least one of:

pair said TV controller to multiple unmanaged devices; and pair each of said at least one unmanaged device to multiple TV controllers, wherein such pairing provides consolidated access to the functions of all paired devices and TV controllers.

* * * * *